(12) United States Patent
Lim et al.

(10) Patent No.: US 11,561,549 B2
(45) Date of Patent: Jan. 24, 2023

(54) METHOD OF CONTROLLING MOBILE ROBOT

(71) Applicant: LG ELECTRONICS INC., Seoul (KR)

(72) Inventors: Seungwook Lim, Seoul (KR); Taekyeong Lee, Seoul (KR); Dongki Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 902 days.

(21) Appl. No.: 16/343,631

(22) PCT Filed: Oct. 20, 2017

(86) PCT No.: PCT/KR2017/011697
§ 371 (c)(1),
(2) Date: Apr. 19, 2019

(87) PCT Pub. No.: WO2018/074903
PCT Pub. Date: Apr. 26, 2018

(65) Prior Publication Data
US 2019/0332115 A1     Oct. 31, 2019

(30) Foreign Application Priority Data
Oct. 20, 2016   (KR) .................. 10-2016-0136522

(51) Int. Cl.
*G05D 1/02*      (2020.01)
*G06T 7/73*      (2017.01)
(Continued)

(52) U.S. Cl.
CPC ......... *G05D 1/0221* (2013.01); *G05D 1/0274* (2013.01); *G06N 20/00* (2019.01);
(Continued)

(58) Field of Classification Search
CPC .............. G05D 1/0221; G05D 1/0274; G05D 2201/0203; G05D 1/0246; G06N 20/00;
(Continued)

(56) References Cited

U.S. PATENT DOCUMENTS 7,539,557 B2 * 5/2009 Yamauchi .............. G05D 1/027
700/262
8,214,079 B2 * 7/2012 Lee ...................... G05D 1/0274
700/245
(Continued)

FOREIGN PATENT DOCUMENTS

JP       2011-201001        10/2011
KR    10-2008-0028185        3/2008
(Continued)

OTHER PUBLICATIONS

European Search Report dated May 26, 2020 issued in Application No. 17861900.3.
(Continued)

*Primary Examiner* — Bhavesh V Amin
(74) *Attorney, Agent, or Firm* — Ked & Associates, LLP

(57) ABSTRACT

A method of controlling a mobile robot includes a first basic learning process of generating a first basic map based on environment information acquired in a traveling process, a second basic learning process of generating a second basic map based on environment information acquired in a separate traveling process, and a merging process of merging the first basic map and the second basic map to generate a merged map.

15 Claims, 16 Drawing Sheets

(51) Int. Cl.
  *G06N 20/00* (2019.01)
  *A47L 9/00* (2006.01)
(52) U.S. Cl.
  CPC .............. *G06T 7/73* (2017.01); *G06T 7/74* (2017.01); *A47L 9/009* (2013.01); *A47L 2201/04* (2013.01); *G05D 2201/0203* (2013.01); *G06T 2207/10016* (2013.01); *G06T 2207/20221* (2013.01)
(58) Field of Classification Search
  CPC ... G06T 7/73; G06T 7/74; G06T 2207/10016; G06T 2207/20221; A47L 9/009; A47L 2201/04; A47L 2201/022; A47L 9/0477; A47L 9/0488; A47L 9/2852; G01C 21/005; B25J 11/00; B25J 19/02; B25J 9/1664; B25J 9/1679; B25J 11/0085; B25J 19/023; G06V 10/462
  See application file for complete search history.

(56) References Cited

U.S. PATENT DOCUMENTS

| | | | | |
|---|---|---|---|---|
| 8,521,330 | B2 * | 8/2013 | Park | G05D 1/0274 |
| | | | | 901/1 |
| 8,897,947 | B2 * | 11/2014 | Nakano | G05D 1/0238 |
| | | | | 701/25 |
| 10,032,276 | B1 * | 7/2018 | Liu | G06T 7/254 |
| 10,288,425 | B2 * | 5/2019 | Lucidarme | G05D 1/0274 |
| 10,354,396 | B1 * | 7/2019 | Liu | G06T 7/292 |
| 11,073,828 | B2 * | 7/2021 | Paden | G05D 1/0088 |
| 2007/0061043 | A1 * | 3/2007 | Ermakov | G05D 1/024 |
| | | | | 700/263 |
| 2007/0065041 | A1 * | 3/2007 | Ming | G06T 7/33 |
| | | | | 382/284 |
| 2007/0293985 | A1 * | 12/2007 | Myeong | G05D 1/0274 |
| | | | | 700/245 |
| 2008/0027591 | A1 * | 1/2008 | Lenser | G05D 1/0038 |
| | | | | 701/28 |
| 2008/0075357 | A1 * | 3/2008 | Yoon | G06V 20/10 |
| | | | | 901/1 |
| 2008/0243305 | A1 * | 10/2008 | Lee | G05D 1/0297 |
| | | | | 901/31 |
| 2008/0294338 | A1 * | 11/2008 | Doh | G05D 1/0234 |
| | | | | 901/1 |
| 2010/0217439 | A1 * | 8/2010 | Park | G05D 1/0274 |
| | | | | 901/1 |
| 2011/0137461 | A1 | 6/2011 | Kong et al. | |
| 2011/0178709 | A1 | 7/2011 | Park et al. | |
| 2011/0238212 | A1 | 9/2011 | Shirado et al. | |
| 2012/0109420 | A1 * | 5/2012 | Lee | G05D 1/0261 |
| | | | | 701/2 |
| 2012/0239191 | A1 * | 9/2012 | Versteeg | F41H 11/13 |
| | | | | 901/1 |
| 2012/0283905 | A1 * | 11/2012 | Nakano | G05D 1/0238 |
| | | | | 701/25 |
| 2014/0142891 | A1 * | 5/2014 | Lucidarme | G01C 15/002 |
| | | | | 702/159 |
| 2014/0350839 | A1 * | 11/2014 | Pack | G05D 1/0274 |
| | | | | 901/1 |
| 2016/0005229 | A1 * | 1/2016 | Lee | G06T 11/60 |
| | | | | 345/419 |
| 2017/0361468 | A1 * | 12/2017 | Cheuvront | G06F 3/01 |
| 2019/0029486 | A1 * | 1/2019 | Suvarna | A47L 11/4061 |
| 2019/0212752 | A1 * | 7/2019 | Fong | A47L 9/2857 |
| 2019/0332115 | A1 * | 10/2019 | Lim | A47L 9/0477 |

FOREIGN PATENT DOCUMENTS

| | | |
|---|---|---|
| KR | 10-2010-0095923 | 9/2010 |
| KR | 10-2010-0100520 | 9/2010 |
| KR | 10-2010-0104581 | 9/2010 |
| KR | 10-2013-0135652 | 12/2013 |
| KR | 10-2016-0100149 | 8/2016 |

OTHER PUBLICATIONS

Korean Notice of Allowance dated May 31, 2018 issued in Application No. 10-2016-0136522.
International Search Report dated Feb. 21, 2018 issued in Application No. PCT/KR2017/011697.

* cited by examiner

METHOD OF CONTROLLING MOBILE ROBOT

CROSS-REFERENCE TO RELATED PATENT APPLICATIONS

This application is a U.S. National Stage Application under 35 U.S.C. § 371 of PCT Application No. PCT/KR2017/011697, filed Oct. 20, 2017, which claims priority to Korean Patent Application No. 10-2016-0136522, filed Oct. 20, 2016, whose entire disclosures are hereby incorporated by reference.

TECHNICAL FIELD

The present invention relates to a mobile robot and a method of controlling the same and, more particularly, a mobile robot for learning a map or recognizing a position thereof on the map.

BACKGROUND ART

Robots have been developed for industrial use and have been used as part of factory automation. In recent years, as applications of robots have been further expanded, medical robots, aerospace robots, etc. are being developed and household robots which may be used at home are being developed. Among these robots, a robot capable of autonomously traveling is called a mobile robot. The representative example of the mobile robot used at home includes a robot cleaner.

In order to accurately move a mobile robot to a desired destination, there is a method of detecting an infrared (IR) signal transmitted from a destination such as a charging stand. However, this method enables only movement to a limited destination for transmitting an infrared signal but disables movement to any other destination. If the mobile robot does not detect the transmitted infrared signal due to a distance or an obstacle, the mobile robot may roam in order to find the destination.

Accordingly, the mobile robot needs to grasp the current position thereof on a map, in order to move to any position in a traveling area.

To this end, in the related art, various methods of continuously grasping the current position of the mobile robot based on traveling information (information on a movement direction and a movement speed, comparison between continuously photographed images of the floor, etc.) at a previous position thereof while the mobile robot continuously moves are known. In addition, various methods of autonomously learning a map at a mobile robot are known.

However, when the position of the mobile robot which is traveling is forcibly changed due to an external factor, the mobile robot cannot recognize the unknown current position thereof based on traveling information at the previous position thereof. For example, a kidnapping situation in which a user lifts and moves a mobile robot which is traveling may occur.

In order for the mobile robot to recognize the current position thereof (localization) on a map even in a position jumping situation including the kidnapping situation, the infrared signal transmitted from a specific point may be used. However, the above-described problems may occur. In addition, a method of using a laser sensor or an ultrasonic sensor in order to recognize the current position in the position jumping situation may be used. However, there is a limit in that cost is increased and detailed information about a surrounding environment cannot be obtained.

Therefore, the related art (Korean Laid-Open Patent Publication No. 10-2010-0104581) discloses technology for recognizing an unknown current position using an image captured through a camera at the current position.

RELATED ART

Patent Document

Korean Laid-Open Patent Publication No. 10-2010-0104581 (Publication Date: Sep. 29, 2010)

DISCLOSURE

Technical Problem

A first object is to provide efficient and accurate position recognition technology in a traveling area.

In the related art, in comparison between any one image and a recognition image, both of which are obtained by capturing the same portion of the same traveling area, estimation accuracy of a current position may be changed depending on whether an illumination in the traveling area is turned on or off. A second object is to solve such a problem and to estimate an unknown current position with higher reliability through comparison between prestored images and recognition images regardless of whether the illumination is turned on or off.

In addition, feature points detected from the image of a ceiling may be changed depending on the illumination in the traveling area is turned on or off. For example, if any one feature point corresponds to an illumination, a plurality of descriptors generated based on an image acquired in a state in which the illumination is turned on may be significantly different from a plurality of descriptors generated based on image acquired in a state in which the illumination is turned off. A third object is to acquire a plurality of images having variable feature points within the same traveling area at different times and to estimate an unknown current position based on the plurality of images.

Technical Solution

The first to third objects of the present invention can be achieved by providing a method of controlling a mobile robot may include a learning process of generating a basic map by traveling once within a traveling area in a state in which an illumination is turned on, generating another basic map by traveling once again in the traveling area in a state in which the illumination is turned off, and merging the two basic maps to generate a merged map. ON/OFF of the illumination within the traveling area is only an external condition and the algorithm of the control method may not include a process of determining whether the illumination is turned on/off.

The first to third objects of the present invention can be achieved by providing a method of controlling a mobile robot including a first basic learning process of generating a first basic map based on environment information acquired in a traveling process, a second basic learning process of generating a second basic map based on environment information acquired in a separate traveling process, and a merging process of merging the first basic map and the second basic map to generate a merged map.

In order to use the nodes generated in the basic learning processes for position estimation, the first basic map may include a plurality of first nodes corresponding to a plurality of points within a traveling area, the second basic map may include a plurality of second nodes corresponding to a plurality of second points within a traveling area, and the merged map may include the plurality of first nodes and the plurality of second nodes.

In order to provide a criterion for merging the two basic maps generated in the separate traveling processes, in the first basic learning process, a first traveling obstacle element may be detected and the first basic map including first border information corresponding to the first traveling obstacle element may be generated. In addition, in the second basic learning process, a second traveling obstacle element may be detected and the second basic map including second border information corresponding to the second traveling obstacle element may be generated. In addition, in the merging process, the first basic map and the second basic map are merged based on the first border information and the second border information.

Specifically, the first basic map may include a first border map corresponding to an entire shape of a first traveling area and a plurality of first nodes having relative coordinate information with respect to the first border map. The second basic map may include a second border map corresponding to an entire shape of a second traveling area and a plurality of second nodes having relative coordinate information with respect to the second border map. In the merging process, the first border map and the second border map may be aligned on one coordinate system to generate the merged map including the plurality of first nodes having coordinate information on the coordinate system and the plurality of second nodes having coordinate information on the coordinate system.

In order to recognize a point in the traveling area corresponding to a current position, in the first basic learning process, a plurality of first nodes on the first basic map corresponding to a plurality of points within a traveling area may be generated. In the second basic learning process, a plurality of second nodes on the second basic map corresponding to a plurality of second points within a traveling area may be generated.

The environment information acquired in each traveling process is regarded as being acquired from the traveling area under specific condition. In order to acquire such environment information from the traveling area under two different conditions and more accurately estimate the current position upon future position recognition, in the first basic learning process, environment information of each first point may be acquired during traveling and each first node on the first basic map corresponding to each first point may be generated. In the second basic learning process, environment information of each second point may be acquired during traveling and each second node on the second basic map corresponding to each second point may be generated.

The first traveling area in the first basic learning process and the second traveling area in the second basic learning process may be different from each other in some cases. Under such a condition, the first basic map and the second basic map should not be merged. To this end, the control method may include a merging condition determination process of determining whether a predetermined merging condition of the first basic map and the second basic map is satisfied, before the merging process. Specifically, in the first basic learning process, a first traveling obstacle element may be detected and a first border map including first border information corresponding to the first traveling obstacle element may be generated. In the second basic learning process, a second traveling obstacle element may be detected and a second border map including second border information corresponding to the second traveling obstacle element may be generated. The merging condition may include a condition in which a degree of similarity between the first border map and the second border map is equal to or greater than a predetermined criterion.

In order to use, in a position recognition process, node information generated in the first and second basic learning processes, the current position may be estimated on the merged map. The control method may further include a node selection process of selecting a node estimated as a current position on a merged map after the merging process.

Specifically, in the first basic learning process, an image of each first point may be acquired during traveling and each first node on the first basic map corresponding to each first point may be generated. In the second basic learning process, an image of each second point may be acquired during traveling and each second node on the second basic map corresponding to each second point may be generated. In the merging process, a merged map including the plurality of first nodes and the plurality of second nodes may be generated. After the merging process, a node selection process of acquiring a recognition image at a current position, comparing recognition image information with image information on the merged map, and selecting a node estimated as the current position among from the plurality of first nodes and the plurality of second nodes on the merged map may be included.

A program for executing the control method may be implemented and a computer-readable recording medium having recorded thereon the program may be implemented.

In addition, a program for executing various rules and operations may be implemented and a computer-readable recording medium having recorded thereon the program may be implemented.

Advantageous Effects

Through the above-described solution, it is possible to estimate an unknown current position with high accuracy regardless of whether an illumination within a traveling area is turned on or off.

In addition, in addition to the illumination within the traveling area, acquired images may vary according to the other conditions. Since a plurality of pieces of image information acquired through traveling at two different times is used as data, reliability of estimation of the unknown current position is increased.

In addition, it is possible to recognize the current position of the mobile robot on a map even in a position jumping situation. Specifically, since it is possible to solve the problem even in a kidnapping situation, global kidnapping recovery is possible.

In addition, when the mobile robot is located at a position on a prestored map in a traveling process other than a position jumping situation, it is possible to more accurately update the map, by comparing newly acquired image information with prestored image.

In addition, since this technology can be implemented only using the image of a ceiling, device implementation is relatively simplified.

In addition, since the current position can be recognized without focal length information of a camera and two-dimensional coordinates of feature points within an image, it is possible to simply implement the technology and to increase estimation accuracy of the current position.

In addition, since this technology can be implemented using a two-dimensional map, a memory can be efficiently used.

The first to third objects of the present invention can be achieved by providing a mobile robot including a traveling unit configured to move a main body, an environment information acquisition unit configured to acquire environment information during traveling, and a controller configured to generate a first basic map and a second basic map based on environment information respectively acquired in separate traveling processes and to merge the first basic map and the second basic map to generate a merged map.

DESCRIPTION OF DRAWINGS

FIG. 10 shows an image acquired in the process S111 and a plurality of feature points f1, f2, f3, f4, f5, f6 and f7 in the image and generation of descriptors $\vec{F1}, \vec{F2}, \vec{F3}, \ldots, \vec{Fm}$, which is an n-dimensional vector, respectively corresponding to the plurality of feature points f1, f2, f3, . . . , and fm in the process S116.

FIG. 14 shows the basic map Ma generated in basic learning processes S110a and S110c performed first in FIG. 6 or 7.

FIG. 15 shows the basic map Mb generated in basic learning processes S110b and S110d performed later in FIG. 6 or 7.

FIG. 18 shows an image acquired in the process S210 and a plurality of recognition feature points h1, h2, h3, h4, h5, h6 and h7 in the image and generation of recognition descriptors ($\vec{H1}, \vec{H2}, \vec{H3}, \vec{H4}, \vec{H5}, \vec{H6}, \vec{H7}$), which is an n-dimensional vector, respectively corresponding to the plurality of recognition feature points h1, h2, h3, h4, h5, h6 and h7 in the process S220.

Like reference numerals are used for like or similar parts throughout the specification.

BEST MODE

Figure 1:
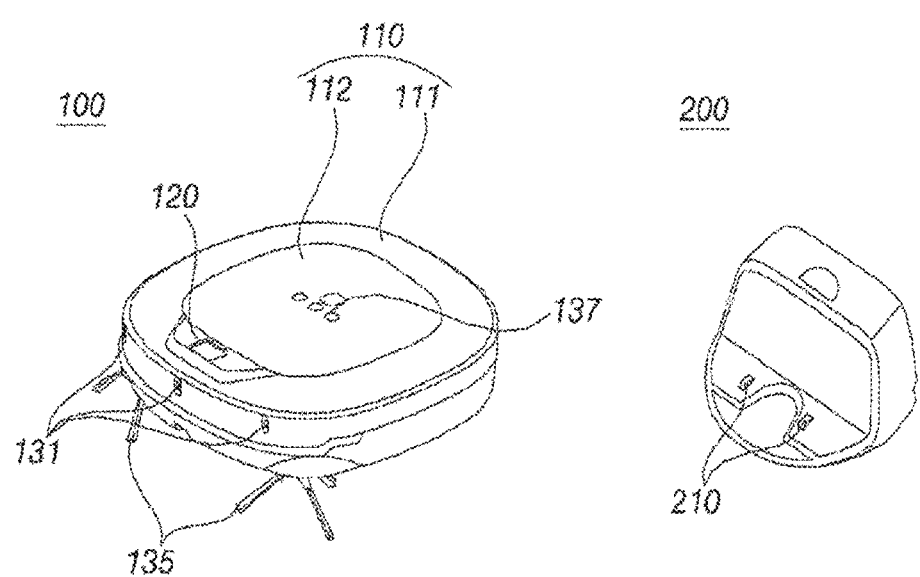
FIG. 1 is a perspective view showing a mobile robot and a charging stand for charging the mobile robot according to an embodiment of the present invention.
Figure 2:
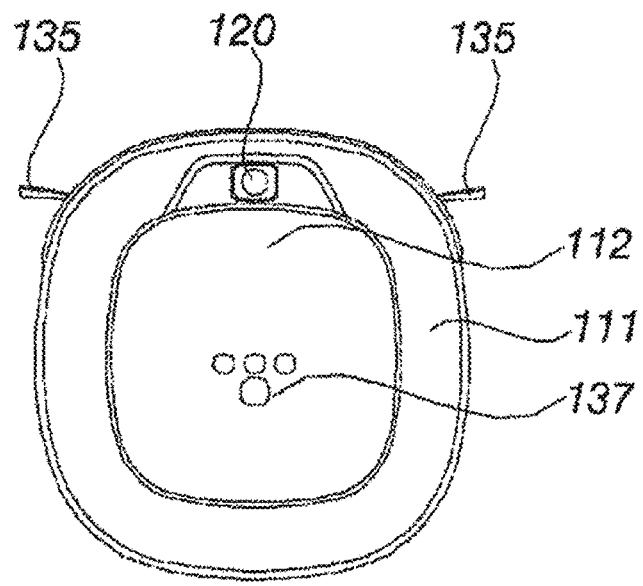
FIG. 2 is a view showing an upper portion of the mobile robot shown in FIG. 1.
Figure 3:
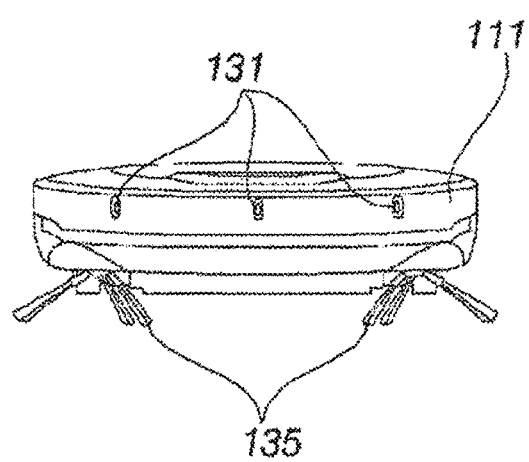
FIG. 3 is a view showing a front portion of the mobile robot shown in FIG. 1.
Figure 4:
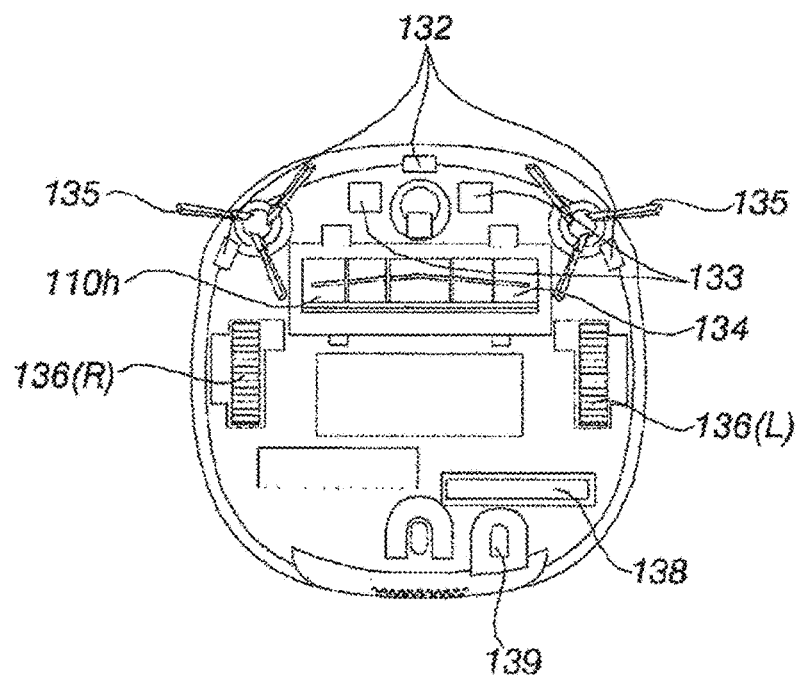
FIG. 4 is a view showing a bottom portion of the mobile robot shown in FIG. 1.

Main terms used throughout the description are as follows.

"Generation" means that data which is not stored is newly generated. "Generating an object B based on an object A" means that the object B is generated as a result of processing information using the object A as an input value.

"Comparing an object A with an object B" means that a degree of similarity between the object A and the object B is determined through the technology according to the embodiment disclosed in the description of the present invention.

"Calculation" means that data is generated as a result value by calculating mathematical data.

"Selection" means that any one of a plurality of objects is determined.

When an object B is determined with respect to an object A, it is said that the object B corresponds to the object A. (For example, each image corresponds to each node.) When an object B corresponds to an object A and an object C corresponds to the object B, it is said that the object C corresponds to the object A.

When at least one element of a group B is determined with respect to each element of a group A, it is said that the group B corresponds to the group A. (For example, a label descriptor group corresponds to a descriptor group.)

"Correspondence" means at least one of univalent correspondence, one-to-many correspondence or one-to-one correspondence. When one object B corresponds to an object A, it is said that the object B univalent-corresponds to the object A. When only one element of a group B corresponds to each element of a group A, it is said that the group B univalent-corresponds to the group A. When a plurality of objects B corresponds to an object A, it is said that the object B one-to-many-corresponds to the object A. When a plurality of elements of the group B corresponds to at least one element of a group A, it is said that the group B one-to-many-corresponds to the group A. When one object B corresponds to one object A, it is said that the object B one-to-one corresponds to the object A. When the number of elements of a group A and the number of elements of a group B are equal and different elements of the group B respectively correspond to the elements of a group A, the group B one-to-one-corresponds to the group A. For example, if a feature point B is detected from any one acquired image A and a descriptor C is generated based on the feature point B, the image A univalent-corresponds to the descriptor C. For example, if a plurality of feature points B and C is detected from any one acquired image A and a plurality of descriptors C and D is generated based on the plurality of feature points B and C, the plurality of descriptors C and D one-to-many-corresponds to the image A. For example, if the number of the plurality of nodes and the number of the plurality of images are equal to each other and different images respectively correspond to the nodes, the plurality of images one-to-one-corresponds to the plurality of nodes.

Correspondence between an object A and an object B is referred to as matching between the object A and the object B. For example, an image matches a node.

A "position jumping situation" means a situation in which a mobile robot has moved in a state in which it is impossible to track a movement route on a map. Specifically, the position jumping situation may occur when the mobile robot has moved in a state in which traveling constraint cannot be measured by a traveling constraint measurement unit 165. Examples of the position jumping situation may include a kidnapping situation in which a user forcibly lifts and moves a mobile robot which is traveling or a situation in which a mobile robot is forcibly moved in a state in which the mobile robot is powered off.

A "learning process" means a process of generating or updating a map using information acquired within a traveling area.

A "basic learning process" means a learning process in which a mobile robot travels to generate one map. The basic learning process includes a first basic learning process and a second basic learning process. The first basic learning process and the second basic learning process are separate processes. Each of a first basic learning process S110*a*, a separate basic learning process S110*b*, a basic learning process S110*c* in a state in which an illumination is turned on and a basic learning process S110*d* in a state in which the illumination is turned off is one basic learning process.

A "recognition process" means a process of grasping the current position of a mobile robot on a map.

The learning process and the recognition process may be simultaneously performed while the mobile robot travels, which is referred to as simultaneous localization and mapping (SLAM).

A "traveling area" means an area of the outside world in which the mobile robot travels. The traveling area includes a first traveling area and a second traveling area. The first traveling area means the traveling area of the first basic learning process and the second traveling area means the traveling area of the second basic learning process. The first traveling area and the second traveling area may be equal to or different from each other in some cases.

A "point" means any one position within the traveling area. The point includes a first point and a second point. The first point means a point of the first traveling area and the second point means a point of the second traveling area.

A "traveling obstacle element" refers to an element for restricting traveling of the mobile robot, and means the element in the traveling area in which the mobile robot is detected. For example, the traveling obstacle element includes the outer surface of an obstacle (a wall or an object placed on the floor) and a beginning part of a cliff. For example, the mobile robot may detect the traveling obstacle element using an obstacle detection sensor 131, a cliff detection sensor 132, a lower camera sensor 139, an image acquisition unit 120 and the other known units. The traveling obstacle element includes a first traveling obstacle element and a second traveling obstacle element. The first traveling obstacle element means the traveling obstacle element of the first traveling area and the second traveling obstacle element means the traveling obstacle element of the second traveling area.

A "map" means data obtained by storing predetermined information of the traveling area in a predetermined format.

A "basic map" means a map generated through the basic learning step. The basic map includes a first basic map and a second basic map. The first basic map is generated in the first basic learning process and the second basic map is generated in the second basic learning process.

A "node" means data indicating any one position on a map corresponding to the point. The node includes a first node and a second node. The first node is generated in the first basic learning process and the second node is generated in the second basic learning process.

"Node information" means a variety of data corresponding to the node.

A "node map" means a map including a plurality of nodes. The node map includes a first node map and a second node map. The first node map means a map including a plurality of first nodes and the second node map means a map including a plurality of second nodes.

"Border information" means data indicating the position on a map corresponding to the traveling obstacle element. The border information includes first border information and second border information. The first border information is generated in the first basic learning process and the second border information is generated in the second basic learning process.

A "border map" means data including a plurality of border information. The border map may correspond to the shape of the traveling area. The border map includes a first border map Ba and a second border map Bb. The first border map Ba means a map including a plurality of pieces of first border information and the second border map Bb means a map including a plurality of pieces of second border information.

A "merged map" means a map generated based on the first basic map and the second basic map.

"Environment information" means a variety of information of the outside world in which the mobile robot is detected. For example, the environment information may include an image, a distance from an object and/or illuminance.

An "image" means an image captured by the mobile robot 100. A "recognition image" means an image acquired at the current position in order to recognize the current position on the map.

An "image corresponding to a node" means an image acquired at a point corresponding to a node.

A "feature point" means the image of a part of an image as any one of several features of the image. A "recognition feature point" means the image of any part of the recognition image as one of several features of the recognition image.

A "descriptor" means data of a predetermined format indicating the feature point and means mathematical data of a format capable of calculating distance or a degree of similarity between descriptors. For example, the descriptor may be data of an n-dimensional vector (n being a natural number) or a matrix format.

When the descriptor may be represented by an n-dimensional vector, the "distance" between two descriptors $\vec{A}, \vec{B}$ means a distance d between n-dimensional vectors and may be calculated by Equation 1 below (n being a natural number).

$$= |\vec{A} - \vec{B}| \quad \text{Equation 1}$$

When the descriptor may be represented by an n-dimensional vector, an "average value" $\vec{A}$(n-dimensional vector) of x (x being a natural number) descriptors $\vec{A1}$, $\vec{A2}$, $\vec{A3}$, ..., $\vec{Ax}$ may be calculated by Equation 2 below (x and n being natural numbers).

$$\vec{A} = \frac{\vec{A1} + \vec{A2} + \vec{A3} + \ldots + \vec{Ax}}{x} \quad \text{Equation 2}$$

A "recognition descriptor" means data of a predetermined format indicating the recognition feature point and means data of the same format as the descriptor.

A "plurality of descriptors in an image" means a plurality of descriptors respectively representing a plurality of feature points detected from any one image. A "plurality of recognition descriptors in a recognition image" means a plurality of recognition descriptors respectively representing a plurality of recognition feature points detected from any one recognition image.

"Image information" is data on any one image and includes an image, a plurality of feature points detected from the image and/or a plurality of descriptors in the image. "Recognition image information" is data on any one recognition image and includes a recognition image, a plurality of recognition feature points detected from the recognition image and/or a recognition descriptor within the recognition image.

The mobile robot 100 of the present invention means a robot capable of autonomously moving using wheels and includes a home assistant robot and a robot cleaner. Hereinafter, a robot cleaner 100 as the mobile robot will be described with reference to FIGS. 1 to 4, without being limited thereto.

Referring to FIGS. 1 to 5, the mobile robot 100 includes a main body 110. The mobile robot 100 includes an environment information acquisition unit for acquiring environment information during traveling. The environment information acquisition unit includes an image acquisition unit 120 for acquiring the image around the main body 110. Hereinafter, in definition of each portion of the main body 110, a portion facing a ceiling of the traveling area is defined as an upper portion (see FIG. 2), a portion facing the floor of the traveling area is defined as a bottom portion, and a main traveling direction portion of the circumference of the main body 110 between the upper portion and the bottom portion is defined as a front portion (see FIG. 3).

The mobile robot 100 includes a traveling unit 160 for moving the main body 110. The traveling unit 160 includes at least one driving wheel 136 for moving the main body 110. The traveling unit 160 may include a driving motor. Driving wheels 136 may be provided at the left and right sides of the main body 110, which are hereinafter referred to as a left wheel 136(L) and a right wheel 136(R).

The left wheel 136(L) and the right wheel 136(R) may be driven by one driving motor. If necessary, a left wheel driving motor for driving the left wheel 136(L) and a right wheel driving motor for driving the right wheel 136(R) may be provided. The traveling direction of the main body 110 may be changed to the left or right by differentiating the rotational speeds of the left wheel 136(L) and the right wheel 136(R).

An inlet 110h for sucking in air may be formed in the bottom portion of the main body 110, and a suction device (not shown) for providing suction force such that air is sucked through the inlet 110h and a dust container (not shown) for collecting dust sucked with air through the inlet 110h may be provided in the main body 110.

The main body 110 may include a case 111 forming a space in which various parts configuring the mobile robot 100 are accommodated. An opening for insertion and removal of the dust container may be formed in the case 111 and a dust container cover 112 for opening and closing the opening may be rotatably provided in the case 111.

A roll-type main brush 134 having bristles exposed through the inlet 110h and an auxiliary brush 135 located at the front side of the bottom portion of the main body 110 and having bristles including a plurality of blades extending in a radial direction may be provided. Dust is removed from the floor within a cleaned area by rotation of the brushes 134 and 135 and the dust separated from the floor is sucked through the inlet 110h and is collected in the dust container.

A battery supplies power necessary for overall operation of the mobile robot 100 in addition to the driving motor. When the battery 138 is discharged, the mobile robot 100 may return to a charging stand 200 for charging. The mobile robot 100 may detect the position of the charging stand 200 by itself while returning.

The charging stand 200 may include a signal transmission unit (not shown) for transmitting a plurality of return signals. The return signal may be an ultrasonic signal or an infrared signal, without being limited thereto.

The mobile robot 100 may include a signal detector (not shown) for receiving the return signal. The charging stand 200 may transmit an infrared signal through a signal transmission unit and the signal detector may include an infrared sensor for detecting the infrared signal. The mobile robot 100 moves to the position of the charging stand 200 according to the infrared signal transmitted from the charging stand 200 to be docked on the charging stand 200. By such docking, charging is performed between the charging terminal 133 of the mobile robot 100 and the charging terminal 210 of the charging stand 200.

The image acquisition unit 120 captures a cleaned area and may include a digital camera. The digital camera may include an image sensor (e.g., a CMOS image sensor) including at least one optical lens and a plurality of photodiodes (e.g., pixels), on which an image is formed by light passing through the optical lens, and a digital signal processor (DSP) for configuring an image based on signals output from the photodiodes. The digital signal processor may generate not only a still image but also a moving image including frames composed of still images.

Preferably, the image acquisition unit 120 is provided on the upper portion of the main body 110 to acquire the image of the ceiling in the cleaned area. However, the position and the capturing range of the image acquisition unit 120 are not limited thereto. For example, the image acquisition unit 120 may be provided to acquire the image of the front side of the main body 110.

In addition, the environment information acquisition unit may include an obstacle detection sensor 131 for detecting a front obstacle. The environment information acquisition unit may include a cliff detection sensor 132 for detecting presence of a cliff in the floor within the cleaned area. The environment information acquisition unit may include a lower camera sensor 138 for acquiring the image of the floor.

In addition, the mobile robot 100 includes an operation unit 137 for inputting on/off or various commands.

Figure 5:
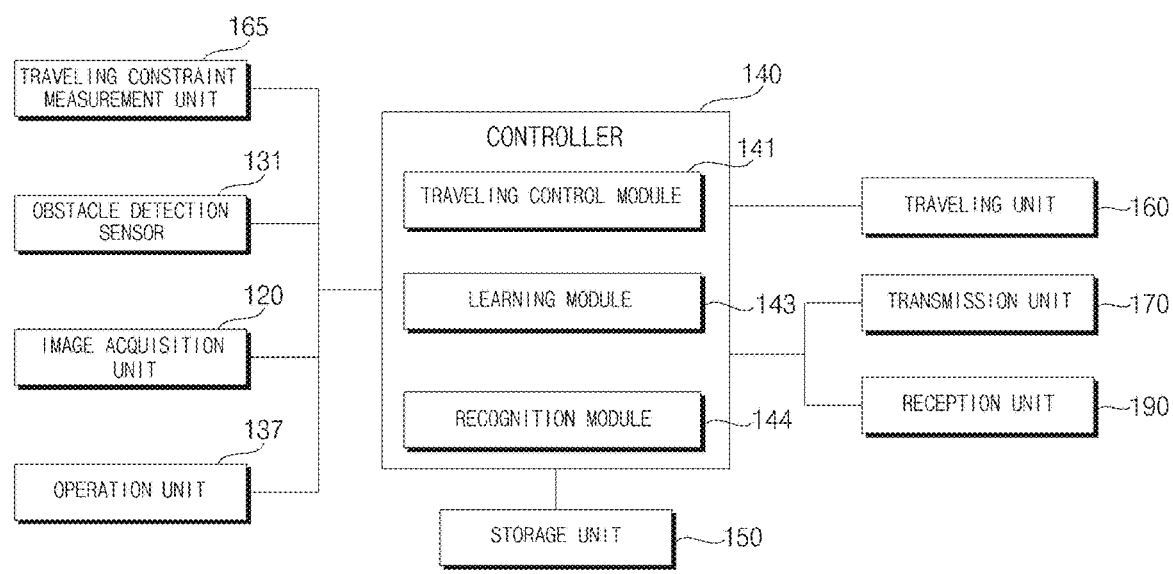
FIG. 5 is a block diagram showing a control relationship between main components of the mobile robot.

Referring to FIG. 5, the mobile robot 100 includes a storage unit 150 for storing a variety of data. A variety of data necessary for control of the mobile robot 100 may be stored in the storage unit 150. The storage unit 150 may include a volatile or non-volatile recording medium. The recording medium stores data which is readable by a microprocessor and may include a hard disk drive (HDD), a solid state drive (SSD), a silicon disk drive (SDD), a ROM, a RAM, a CD-ROM, a magnetic tape, a floppy disk, an optical data storage device, etc.

The map of the traveling area may be stored in the storage unit 150. The map may be input by an external terminal which may exchange information with the mobile robot 100 through wired or wireless communication and may be generated by self-learning of the mobile robot 100. In the former case, examples of the external terminal include a remote controller in which an application for setting a map is installed, a PDA, a laptop, a smartphone, a tablet, etc.

The positions of a plurality of nodes corresponding (one-to-one-corresponding) to a plurality of points within the traveling area may be displayed on the map. Each area of the traveling area may be displayed on the map. In addition, the current position of the mobile robot 100 may be displayed on the map. The current position of the mobile robot 100 on the map may be updated in a traveling process.

A traveling constraint includes a movement direction and a movement distance of the mobile robot. When it is assumed that the floor of the traveling area is on a plane in which X and Y axes are perpendicular to each other, the traveling constraints may be expressed by $\Delta x$, $\Delta y$ and $\theta$. $\Delta x$ and $\Delta y$ respectively mean constraints in the X and Y axes and $\theta$ means a rotation angle.

The environment information acquisition unit may include a traveling constraint unit 165. The traveling constraint measurement unit 165 may measure a traveling constraint based on the image acquired by the lower camera sensor 139. For example, the traveling constraint measurement unit 165 may measure the traveling constraint through comparison between continuous pixels of the image of the floor changed according to continuous movement of the mobile robot 100.

The traveling constraint measurement unit 165 may measure the traveling constraint of the mobile robot 100 based on operation of the traveling unit 160. For example, a traveling control module 141 may measure a current or past movement speed, a traveled distance, etc. based on the rotation speeds of the driving wheels 136 and measure a current or past direction change process according to the rotation direction of the driving wheels 136(L) and 136(R).

The traveling constraint measurement unit 165 may measure the traveling constraint using at least one of the obstacle detection sensor 131 or the image acquisition unit 120.

A controller 14 may recognize the position of the mobile robot 100 on the map based on the measured traveling constraint.

A transmission unit 170 may transmit information of the mobile robot to another mobile robot or a central server. A reception unit 190 may receive information from another mobile robot or the central server. The information transmitted by the transmission unit 170 or the information received by the reception unit 190 may include configuration information of the node N of the mobile robot.

The mobile robot 100 includes the controller 14 for processing and determining a variety of information. The controller 140 may perform information processing for learning the traveling area. The controller 140 may perform information processing for recognizing the current position on the map. The controller 140 may control overall operation of the mobile robot 100 through control of various components of the mobile robot 100 (e.g., the traveling constraint measurement unit 165, the obstacle detection sensor 131, the image acquisition unit 120, the operation unit 137, the traveling unit 160, the transmission unit 170, the reception unit 190, etc.). The controller 140 may include the traveling control module 141, a learning module 143 and a recognition module 144.

The traveling control module 141 controls traveling of the mobile robot 100. The traveling control module 141 controls driving of the traveling unit 160 according to traveling setting.

The learning module 143 generates the map of the traveling area. For position recognition in the entire area, the learning module 143 matches an image acquired at each point with each node N on the map. The acquired images may one-to-one-correspond to the nodes.

The learning module 143 generates a node on the map based on the traveling constraint information. For example, node coordinate information may be generated based on the traveling constraint measured based on an origin node O. The node coordinate information D186 of the generated node N may be a coordinate value relative to the original node O. Node information may include image information D183 corresponding to the node.

The learning module 143 may generate a map based on the node N and the traveling constraint between nodes. The learning module 143 may generate a map based on border information.

The learning module 143 may update the pre-generated map. For example, the learning module 143 may update the prestored node coordinate information D186 based on the below-described loop constraint.

The learning module 143 may divide an entire area into a plurality of areas according to a predetermined criterion. The learning module 143 may divide a large area into a plurality of areas according to a predetermined criterion. A plurality of areas may be grouped into a large area according to a predetermined criterion.

The recognition module 144 may recognize a current position using at least one of the obstacle detection sensor 131 or the image acquisition unit 120. The recognition module 144 may recognize an unknown current position in a position jumping situation. The recognition module 144 may recognize the current position on the map. The recognition module 144 may select a node corresponding (univalent-corresponding) to the current position from among the plurality of nodes on the map. Hereinafter, for example, a process of recognizing the unknown current position using the image acquisition unit 120 will be described, without being limited thereto.

A method of controlling a mobile robot according to an embodiment of the present invention includes learning processes S100 and S150. The method of controlling the mobile robot includes a recognition process S200.

The control method includes a first basic learning process S110*a* of generating a first basic map Ma based on environment information acquired in a traveling process. The control method includes a second basic learning process S110*b* of generating a second basic map Mb based on environment information acquired in a traveling process different from the traveling process of the first basic learning process S110a, after the first basic map Ma is generated. The control method includes a merging process S135 of merging the first basic map Ma and the second basic map Mb to generate a merged map Mu, after the second basic map Mb is generated.

Figure 6:
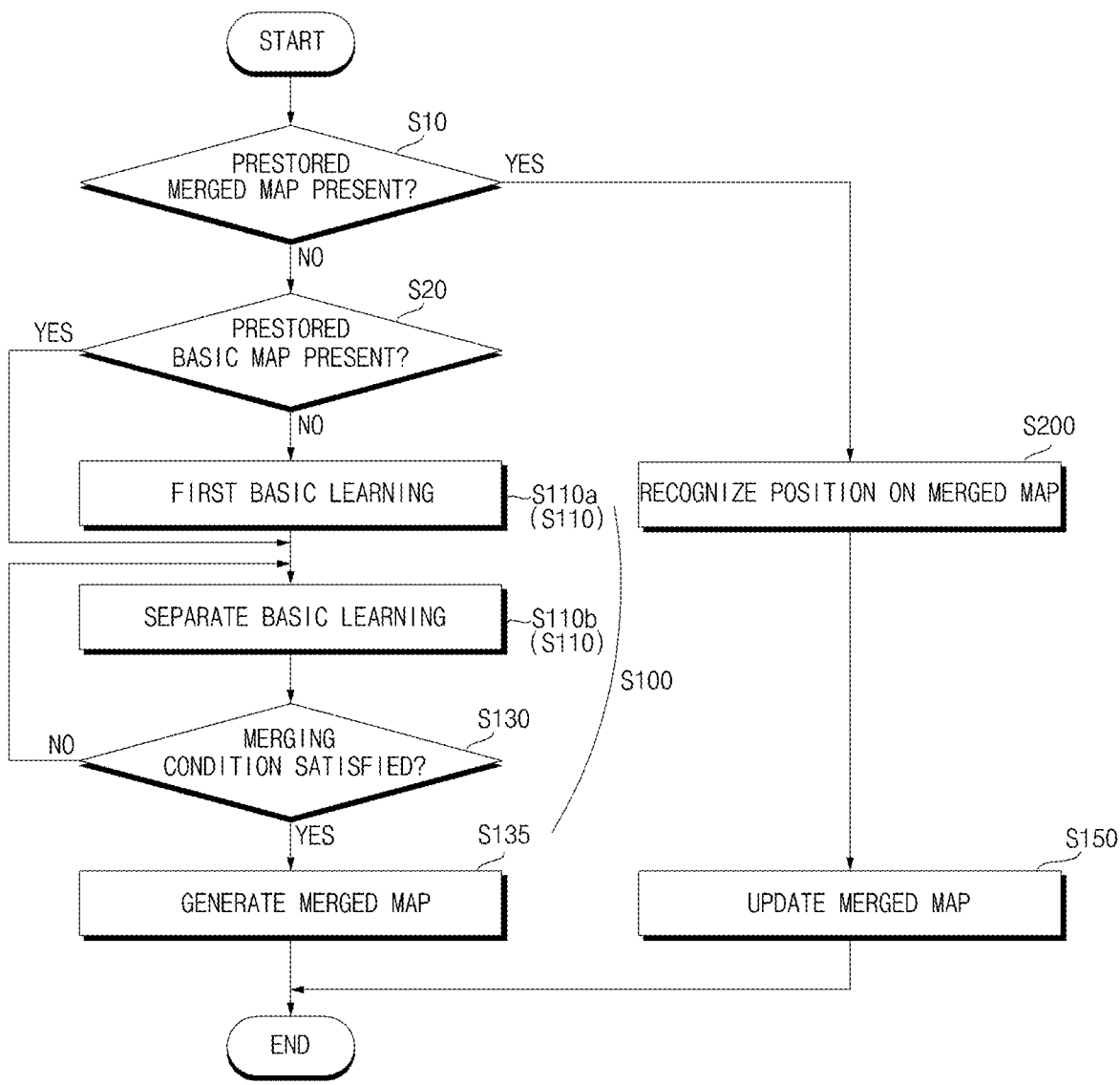
FIG. 6 is a flowchart illustrating a control method according to an embodiment of the mobile robot of FIG. 1.

Referring to FIG. 6, when traveling of the mobile robot 100 starts, presence of a prestored merged map Mu is determined (S10). Determination as to presence of the prestored merged map Mu may be a process of determining whether the merged map Mu is stored in the storage unit 150 of the mobile robot 100. Upon determining that the prestored merged map Mu is not present as the result of the process S10, the mobile robot 100 determines presence of a prestored basic map (S20). Determination as to presence of the prestored basic map may be a process of determining whether at least one basic map is stored in the storage unit 150 of the mobile robot 100. In the process S20, whether at least one prestored basic map is present is determined. Upon determining that the prestored basic map is not present as the result of the process S20, the mobile robot 100 starts a first basic learning process S110a. When the first basic learning process S110a is finished, the mobile robot 100 starts a separate basic learning process S110b. As the result of the process S110a, one basic map Ma is generated. As the result of the process S110b, the basic map Mb is generated. The basic map Mb may be different from the basic map Ma. Hereinafter, the basic map Ma is referred to as a first basic map Ma and the basic map Mb is referred to as a second basic map Mb. When the separate basic learning process S110b is finished, the mobile robot 100 performs a process S130 of determining whether a predetermined merging condition of the first basic map Ma and the second basic map Mb is satisfied. When the merging condition is satisfied in the process S130, the mobile robot 100 performs a merging process S135 of merging the first basic map Ma and the second basic map Mb to generate a merged map Mu.

When the prestored merged map Mu is not present in the process S10, the mobile robot 100 performs a process S200 of recognizing the current position on the merged map Mu. Based on the environment information acquired through the process S200, the mobile robot 100 performs a learning process S150 of updating the merged map Mu. The process S150 may include a process of generating a new node on the prestored merged map based on the environment information obtained in a portion, in which the robot newly travels, of the traveling area. In addition, the process S150 may include a process of updating a portion of information on the node on the prestored merged map based on the environment information obtained in the traveling area. In this manner, the position recognition process S200 and the learning process S150 may be continuously and simultaneously performed (SLAM). In addition, the process S150 may include a process of updating a portion of border information on the prestored merged map based on the environment information obtained in the traveling area. Hereinafter, a series of learning processes S100 of generating the basic maps and the merged map will be described, without being limited thereto, and the following description is applicable to the learning process S150 of updating the map.

When the prestored basic map is present as the result of the process S20, the mobile robot 100 performs the separate basic learning process S110b without performing the first basic learning process S100a. A situation in which the basic map Ma is present but the merged map Mu is not present may occur when the first basic learning process S110a is already performed before the process S20. In addition, a situation in which the basic map Ma is present but the merged map Mu is not present may occur when the first basic learning process S110a and the separate basic learning process S110b are already performed before the process S20 but the merging condition is not satisfied.

When the merging condition is not satisfied in the process S130, the mobile robot 100 performs the separate basic learning process S110b again. After the separate basic learning process S110b is performed again, the process S130 of determining whether the merging condition is satisfied is performed again. When any two of a plurality of prestored basic maps satisfy the merging condition in the process S130, the mobile robot 100 performs the merging process S130.

The first basic learning process S110a is referred to as a first basic learning process S110a. The separate basic learning process S110b is referred to as a second basic learning process S110b. The first basic learning process S110a is performed earlier than the second basic learning process S110b. The algorithm of the first basic learning process S110a and the algorithm of the second basic learning process S110b may be substantially the same. The learning process S10 includes the first basic learning process S110a, the second basic learning process S110b and the merging process S135. The learning process S100 includes the process S130 of determining whether the merging condition is satisfied after the second basic learning process S110b and before the merging process S135.

Figure 7:
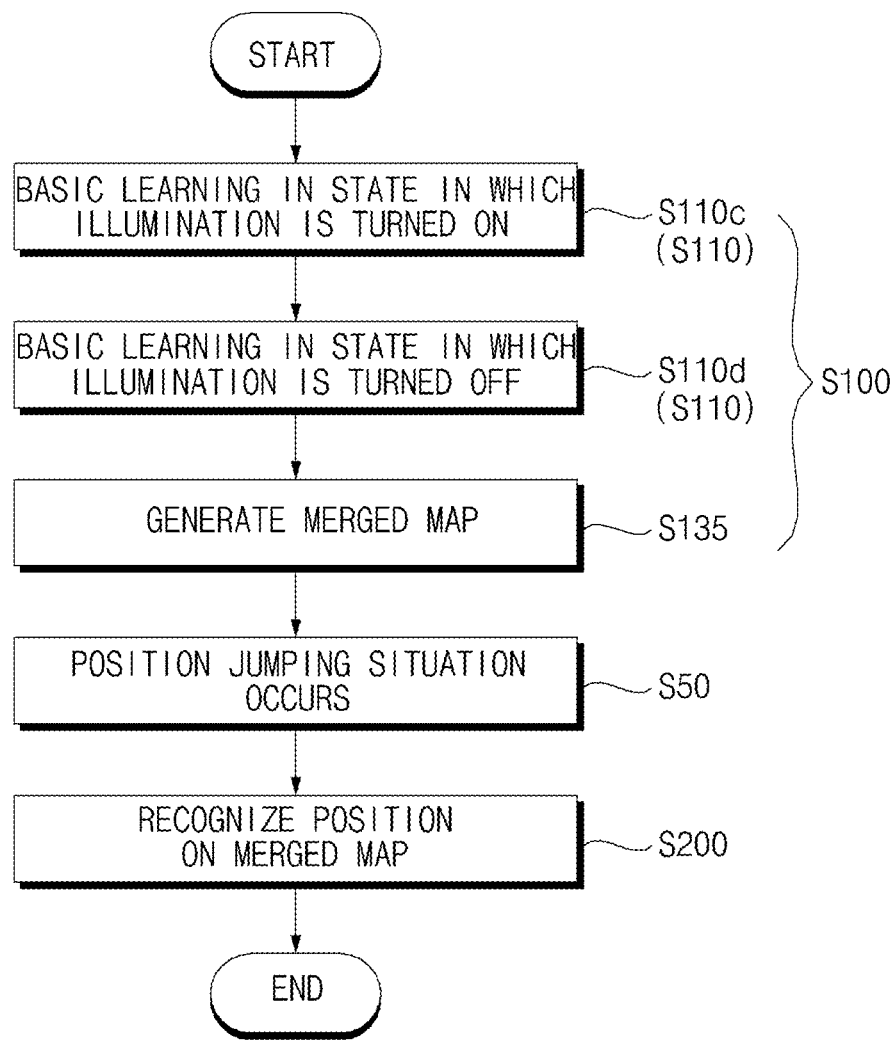
FIG. 7 is a flowchart illustrating a process performed by the mobile robot controlled according to the control method of FIG. 6 according to one scenario.

Referring to FIG. 7, a scenario in which the learning process S100 and the recognition process S200 start will be described. Any one of the basic learning process S110c performed in the traveling area in the state in which the illumination is turned on and the basic learning process S110d performed in the traveling area in the state in which the illumination is turned off may be the first basic learning process S110a and the other thereof may be the second basic learning process S110b. In the scenario of FIG. 7, the basic learning process S110c performed in the traveling area in the state in which the illumination is turned on is the first basic learning process S110a and the basic learning process S110d performed in the traveling area in the state in which the illumination is turned off is the second basic learning process S110b, and vice versa. (In another example, the basic learning process S110d performed in the traveling area in the state in which the illumination is turned off may be the first basic learning process S110a and the basic learning process S110c performed in the traveling area in the state in which the illumination is turned on may be the first basic learning process S110a.) The user may directly instruct the mobile robot 100 to start the basic learning process S110 through the operation unit 137 of the mobile robot 100 in the state in which the illumination is turned on or off. Alternatively, the mobile robot 100 may autonomously determine whether the illumination of the traveling area is turned on or off through an illuminance sensor (not shown) provided in the mobile robot 100 or an illuminance sensor installed in the traveling area, thereby starting the basic learning process S110. In any case, the control method includes at least two basic learning processes S110.

In the scenario of FIG. 7, the environment information of the traveling area in which the illumination is turned on is acquired through the first basic learning process S110c to generate the first basic map Ma (S110c). Thereafter, the environment information of the traveling area in the illumination is turned off is acquired through the second basic learning process S110b to generate the second basic map Mb (S110d). Thereafter, the merging condition of the first basic map Ma and the second basic map Mb is satisfied. Thereafter, the first basic map Ma and the second basic map Mb are merged to generate a merged map Mu (S135). Thereafter, a position jumping situation occurs (S50). Then, the mobile robot 100 starts a process S200 of recognizing the current position on the merged map Mu.

Figure 8:
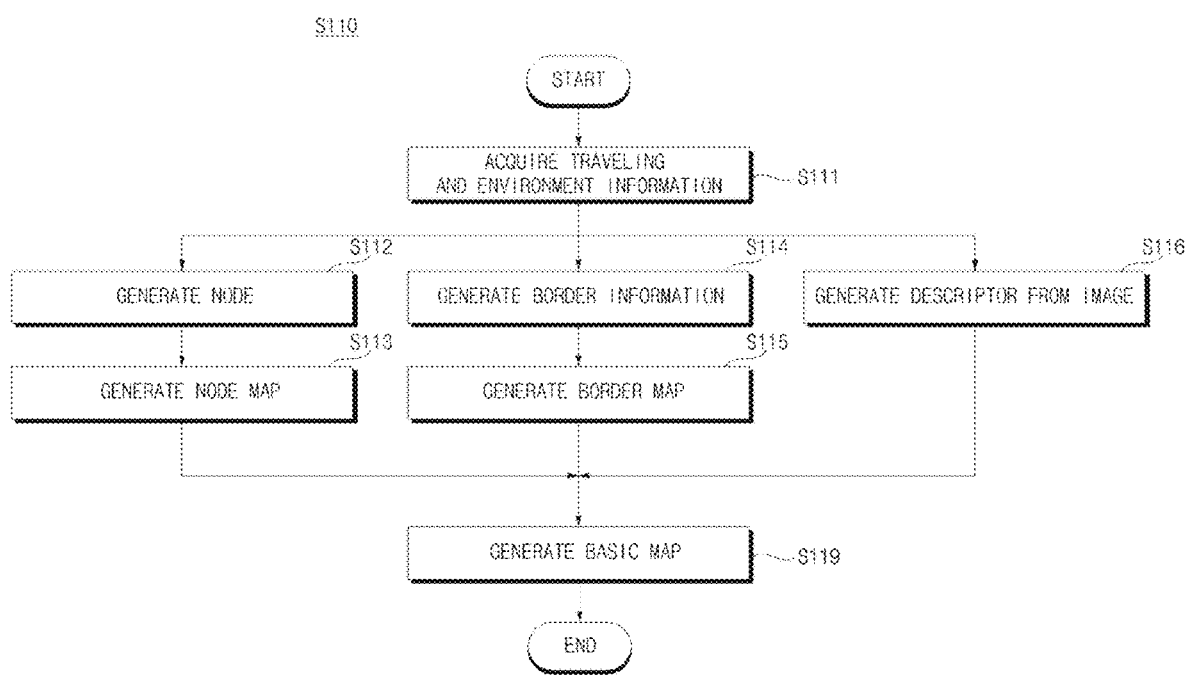
FIG. 8 is a flowchart illustrating a process of a basic learning step S110 of FIGS. 6 and 7 in detail.

Referring to FIG. 8, the basic learning process S110 will be described in greater detail. The basic learning process S110 is any one of the first basic learning process S110a and the second basic learning process S110b. The basic learning process S110 is any one of the first basic learning process S110a, the separate basic learning process S110b, the basic learning process S110c performed in the traveling area in the state in which the illumination is turned on and the basic learning process S110d performed in the traveling area in the state in which the illumination is turned off. Each of the processes S110a, S100b, S110c and S110d is the basic learning process S110.

The basic learning process S110 includes a traveling process in the traveling area. The basic learning process S110 includes a process S111 of acquiring the environment information during traveling. The mobile robot may acquire the environment information using the obstacle detection sensor 131, the cliff detection sensor 132, the lower camera sensor 139, the image acquisition unit 120 and the other known units.

The environment information includes an image. The image is obtained by capturing a portion of the traveling area. The image is obtained by capturing a ceiling. In the process S111, the mobile robot 100 acquires images of points separated from each other during traveling. A plurality of acquired images may one-to-one-correspond to a plurality of points.

The environment information includes a distance from a traveling obstacle element. For example, the mobile robot 100 may acquire a distance value from any one point to a wall.

The environment information may include illuminance of the traveling area. For example, the mobile robot 100 may detect whether the illumination of the traveling area is turned on/off.

The environment information may include other information which may be detected by the mobile robot 100 within the traveling area.

The basic learning process S110 includes a process S112 of generating a node based on the acquired environment information. The basic learning process S110 includes a process S112 of generating a node based on the measured traveling constraint. Each node corresponds to the coordinate information of each point. Each node corresponds to each image acquired at each point. Image information corresponds to each node. A plurality of acquired images may one-to-one-correspond to a plurality of nodes. The process S112 may be performed during a process of moving to a next point after acquiring an image at any one point. The process S112 may be performed during the process S111.

In the basic learning process S110, a plurality of nodes on the basic maps Ma and Mb corresponding to a plurality of points of the traveling area is generated. In the first basic learning process S110a, a plurality of first nodes on the first basic map Ma corresponding to a plurality of points of a first traveling area is generated. In the second basic learning process S110b, a plurality of second nodes on the second basic map Mb corresponding to a plurality of points of a second traveling area is generated.

In the basic learning process S110, the environment information of each point is acquired during traveling and each node on the basic map Ma or Mb corresponding to each point are generated. In the first basic learning process S110a, the environment information of each first point is acquired during traveling and each first node on the first basic map Ma corresponding to each first point is generated. In the second basic learning process S110b, the environment information of each second point is acquired during traveling and each second node on the second basic map Mb corresponding to each second point is generated.

In the basic learning process S110, an image of each point is acquired during traveling and each node on the basic map corresponding to each point is generated. In the first basic learning process S110a, an image of each first point is acquired during traveling and each first node on the first basic map Ma corresponding to each first point is generated. In the second basic learning process S110b, an image of each second point is acquired during traveling and each second node on the second basic map Mb corresponding to each second point is generated. In the merging process S135, a merged map including the plurality of first nodes and the plurality of second nodes is generated.

Specifically, a merged map including the plurality of nodes one-to-one-corresponding to the plurality of first nodes and the plurality of second nodes is generated. The plurality of first nodes and the plurality of second nodes have coordinate information of each point. Before the merging process S135, the coordinate system of the coordinate information of each of the plurality of first nodes and the coordinate system of the coordinate information of each of the plurality of second nodes are different from each other. In the merging process S135, the coordinate information of any one of the plurality of first nodes and the plurality of second nodes is changed such that the coordinate system of the coordinate information of each of the plurality of first nodes and the coordinate system of the coordinate information of each of the plurality of second nodes are aligned on one coordinate system. For example, the coordinate information of only any one of the plurality of first nodes and the plurality of second nodes may be changed into the other coordinate system. In another example, the coordinate information of both the plurality of first nodes and the plurality of second nodes may be changed into a newly generated coordinate system.

The coordinate information of both the plurality of first nodes and the plurality of second nodes is changed, relative coordinates (relative positional relationship) among the plurality of nodes on the merged map Mu one-to-on-corresponding to the plurality of first nodes is equal to relative coordinates among the plurality of first nodes on the first basic map Ma, and relative coordinates (relative positional relationship) among the plurality of nodes on the merged map Mu one-to-on-corresponding to the plurality of second nodes is equal to relative coordinates among the plurality of first nodes on the first basic map Ma. That is, the relative coordinates among the nodes corresponding to the plurality of first nodes among the plurality of nodes are maintained on the merged map Mu even in the merging process S135, and the relative coordinates among the nodes corresponding to the plurality of second nodes among the plurality of nodes are maintained on the merged map Mu even in the merging process S135.

The environment information includes image information. The plurality of first nodes and the plurality of second nodes have image information acquired at each point. The image information of each of the plurality of nodes on the merged map Mu one-to-one-corresponding to the plurality of first nodes is equal to the image information of each of the plurality of first nodes on the first basic map Ma. The image information of each of the plurality of nodes on the merged map Mu one-to-one-corresponding to the plurality of second nodes is equal to the image information of each of the plurality of second nodes on the second basic map Mb. That is, the image information of the plurality of first and second nodes is maintained in the merging process S135.

The basic learning process S110 includes a process S113 of generating a node map composed of the plurality of nodes generated in the process S112. The node map includes the plurality of nodes. The node map may include a plurality of pieces of node information.

The basic learning process S110 includes a process S114 of generating border information based on the acquired environment information. The basic learning process S110 includes a process S114 of generating border information based on a measured distance value from the traveling obstacle element. For example, when the mobile robot 100 detects a traveling obstacle element at a position separated ahead from any one point P1 in the traveling area by a distance value d1, border information having coordinate information at the position separated ahead from any one node N1 corresponding to the point P1 on the basic map by the distance value d1 is generated. The process S114 may be performed during the process of moving a next point after acquiring the environment information at any one point. The process S114 may be performed while the process S111 is performed.

The basic learning process S110 includes a process S115 of generating a border map composed of a plurality of pieces of border information generated in the process S114. The border map includes a plurality of pieces of border information. The border map may correspond to the entire shape of the traveling area.

In the basic learning process S110, the traveling obstacle element is detected and the border map including the border information corresponding to the traveling obstacle element is generated. In the first basic learning process S110a, a first traveling obstacle element is detected and a first border map Ba including first border information corresponding to the first traveling obstacle element is generated. In the second basic learning process S110b, a second traveling obstacle element is generated and a second border map Bb including second border information corresponding to the second traveling obstacle element is generated.

Each of the basic maps Ma and Mb includes the node map and the border map. The node map refers to information composed of a plurality of nodes among various pieces of information on one basic map and the border map refers to information composed of a plurality of pieces of border information among various pieces of information on one basic map. The node map and the border map are components of the basic map and the processes S112 and S113 of generating the node map and the processes S114 and S115 of generating the border map are simultaneously performed. For example, the border information may be generated based on the coordinate information D186 of a prestored node corresponding to a specific point after measuring the distance of the traveling obstacle element separated from the specific point. For example, the node coordinate information D186 of the node may be generated based on prestored border information corresponding to a specific traveling obstacle element after measuring a distance of a specific point separated from the specific traveling obstacle element. One of the node and border information may be generated on the basic map based on the coordinates of one information relative to the other prestored information.

Each of the basic maps Ma and Mb includes a plurality of nodes corresponding to a plurality of points within the traveling area. The first basic map Ma includes a plurality of first nodes corresponding to a plurality of first points within the first traveling area. The second basic map Mb includes a plurality of second nodes corresponding to a plurality of second points within the second traveling area. The first traveling area and the second traveling area are equal to or different from each other. The mobile robot 100 starts the first basic learning process S110a and the second basic learning process S110b without knowing whether the first traveling area and the second traveling area are equal to each other. If the merging condition is satisfied after the second basic learning process S110b, it is determined that the first traveling area and the second traveling area are equal to each other and the first basic map Ma and the second basic map Mb are merged to generate a merged map Mu. The merged map Mu includes the plurality of first nodes and the plurality of second nodes.

Each of the basic maps Ma and Mb may include a border map corresponding to the shape of the traveling area. The first map Ma may include the first border map Ba corresponding to the shape of the first traveling area. The second basic map Mb may include the second border map Bb corresponding to the shape of the second traveling area. In the merging process S135, the first basic map Ma and the second basic map Mb are merged based on the first border map Ba and the second border map Bb. Even if the first traveling area and the second traveling area are equal to each other, a traveling condition deviation or a measurement deviation occurs in the first basic learning process S110a and the second basic learning process S110b and thus the first border map Ba and the second border map Bb may not be equal to each other. The merging condition includes a condition in which a degree of similarity between the first border map Ba and the second border map Bb is equal to or greater than a predetermined criterion. When the merging condition is satisfied, even if there is some difference between the first border map Ba and the second border map Bb, the first basic map Ma and the second basic ma Mb are merged based on the same portion between the first border map Ba and the second border map Bb.

Each of the basic maps Ma and Mb include the border map and a plurality of nodes having relative coordinate information with respect to the border map. The first basic map Ma includes the first border map Ba and a plurality of first nodes having the relative coordinate information with respect to the first border map Ba. The second basic map Mb includes the second border map Bb and a plurality of second nodes having the relative coordinate information with respect to the second border map Bb. In the merging process S135, the first border map Ba and the second border map Bb are aligned on one coordinate system to generate a merged map Mu including the plurality of first nodes having the coordinate information on the coordinate system and the plurality of second nodes having the coordinate information on the coordinate system. For example, one coordinate system may be one planar coordinate system (XY-axis coordinate system). Based on a portion having a degree of similarity equal to or greater than a predetermined criterion between the first border map Ba and the second border map Bb, the first basic map Ma and the second basic map Mb are aligned on one coordinate system in terms of direction and position and the first basic map Ma and the second basic map Mb are merged.

The basic learning process S110 includes a process S116 of generating a plurality of descriptors from the acquired image. Specifically, in the process S116, a plurality of feature points is detected from the acquired image. In this process S116, descriptors respectively corresponding to the plurality of detected feature points are generated. The plurality of descriptors one-to-one-corresponds to the plurality of feature points. The process S116 may be performed during the process of moving a next point after acquiring an image at any one point. The process S116 may be performed while the process S111 is performed.

When the node map is generated in the process S113 and the border map is generated in the process S115, the basic maps Ma and Mb composed of the node map and the border map are generated (S119). Each of the basic maps Ma and Mb include the node map and the border map. Each of the basic maps Ma and Mb may further include image information generated in the process S116. The plurality of pieces of image information one-to-one-corresponds to the plurality of nodes. Specific image information corresponds to a specific node.

In the basic learning process S110, the traveling obstacle element is detected and the basic map Ma or Mb including the border information corresponding to the traveling obstacle element is generated. In the first basic learning process S110a, the first traveling obstacle element is detected and the first basic map Ma including the first border information corresponding to the first traveling obstacle element is generated. In the second basic learning process, the second traveling obstacle element is detected and the second basic map Mb including the second border information corresponding to the second traveling obstacle element is generated. In the merging process S135, the first basic map Ma and the second basic map Mb are merged based on the first border information and the second border information. Even if the first traveling area and the second traveling area are equal to each other, a traveling condition deviation or a measurement deviation occurs in the first basic learning process S110a and the second basic learning process S110b and thus the plurality of pieces of first border information and the plurality of pieces of second border information may not be equal to each other. The merging condition includes a condition in which a degree of similarity between the plurality of pieces of first border information and the plurality of pieces of second border information is equal to or greater than a predetermined criterion. When the merging condition is satisfied, even if there is some difference between the plurality of pieces of first border information and the plurality of pieces of second border information, the first basic map Ma and the second basic ma Mb are merged based on the same portion between the plurality of pieces of first border information and the plurality of pieces of second border information.

Figure 9:
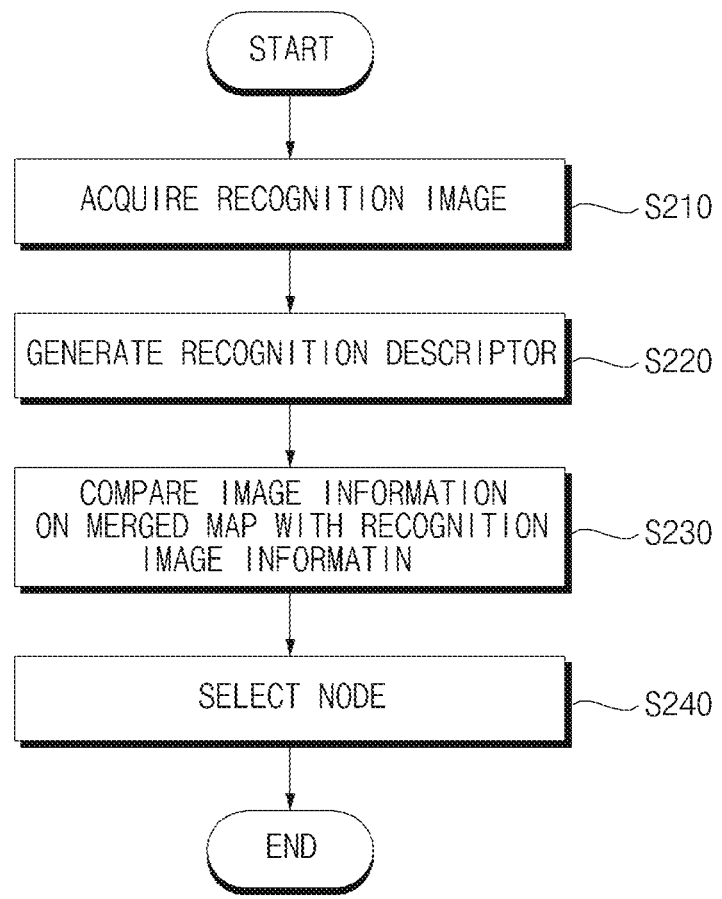
FIG. 9 is a flowchart illustrating a process of a recognition process S200 of FIGS. 6 and 7 in detail.

Referring to FIG. 9, the recognition process S200 includes a recognition image acquisition process S210. The recognition process S200 includes a process S220 of generating a recognition descriptor based on the recognition image. The recognition process S200 includes a process S230 of comparing the image information on the merged map Mu with the recognition image information. The recognition process S200 includes a process S240 of selecting a node estimated as a current position among form the plurality of nodes on the merged map Mu.

In the recognition image acquisition process S210, the mobile robot 100 acquires the recognition image at an unknown current position. The process S210 may be performed in a position jumping situation. The process S210 may be performed when the prestored merged map Mu is present in the mobile robot 100.

In the recognition descriptor generation process S220, recognition descriptors respectively corresponding to the plurality of recognition feature points detected from the acquired recognition image are generated. The plurality of recognition descriptors one-to-one-corresponds to the plurality of recognition feature points. The process S220 may be performed after at least one recognition image is acquired at the unknown current position.

For example, in the comparison process S230, the node information is compared with the recognition image information acquired at the current position for each node to be compared. As the method of comparing the image information of each node with the recognition image information, any one of various known methods may be used.

In another example, in the comparison process S230, the recognition image information is compared with the image information on the merged map. As the method of comparing the plurality of descriptors generated based on the plurality of images with the plurality of recognition descriptors generated based on the recognition image, any one of various known methods may be used.

In the node selection process S240, a node having a largest degree of similarity among the degrees of similarity calculated for each node to be compared may be selected. In the node selection process S240, a node estimated as the current position is selected among from the plurality of first nodes and the plurality of second nodes on the merged map Mu. The mobile robot 100 may recognize the node selected in the process S270 as the current position and continuously travel based on the current position.

Hereinafter, referring to FIGS. 10 to 15, a detailed example of the basic learning process S110 will be described. The traveling area includes a floor 1 and a ceiling 2. The traveling area includes a wall 3 and a vertical element for restricting traveling of the mobile robot 100.

Figure 10:
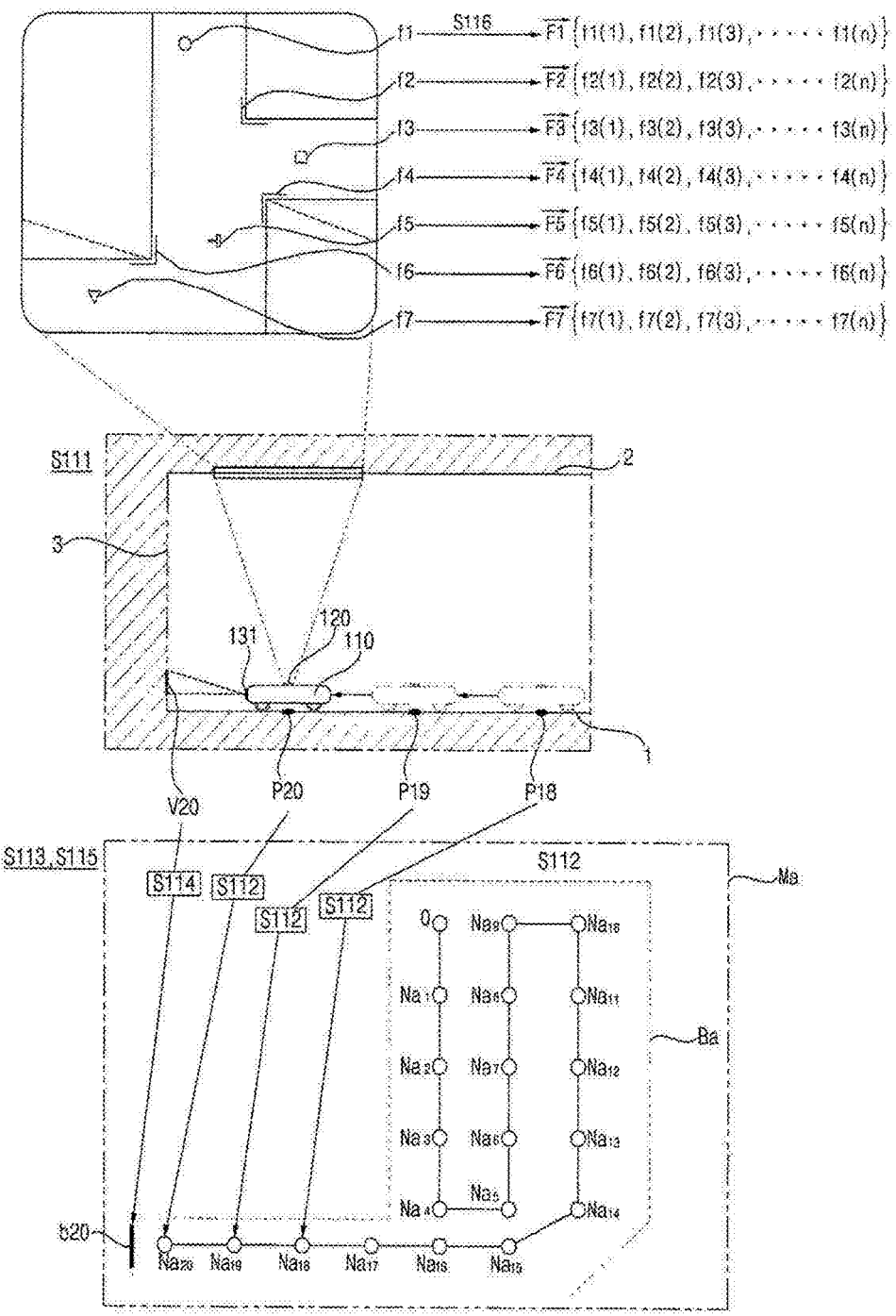
FIG. 10 is a view showing a traveling and environment information acquisition process S111, a node generation process S112, a node map generation process S113, a border generation process S114, a border map generation process S115 and a descriptor generation process S116.

Referring to FIG. 10, in the environment information acquisition process S111, the image acquisition unit 120 acquires an image from each point (e.g., P18, P19 or P20) while the mobile robot 100 travels along the floor 1. The image is obtained by capturing the upper side of the mobile robot 100. The image is obtained by capturing the ceiling 2. The image shown in FIG. 10 corresponds to the point P20. In the environment information acquisition process S111, while the mobile robot 100 travels, the obstacle detection sensor 131 detects a traveling obstacle element. The obstacle detection sensor 131 may be any one of an infrared (IR) sensor, an ultrasonic sensor and an image sensor. The traveling obstacle element may be detected by the cliff detection sensor 132, the lower camera sensor 139, the image acquisition unit 120 and the other known units. The mobile robot 100 may detect the traveling obstacle element at each point P18, P19 or P20. The mobile robot detects the outer surface of the wall 3 which is one of the traveling obstacle elements.

Referring to FIG. 10, in the node generation process S112, the mobile robot 100 generates a node Na20 corresponding to the point P20. In the node generation process S112, the mobile robot 100 generates nodes Na18, Na19 and Na20 respectively corresponding to the points P18, P19 and P20. The plurality of points P18, P19 and P20 one-to-one-corresponds to the plurality of nodes Na18, Na19 and Na20. The coordinate information D186 corresponding to the node Na20 may be generated based on the traveling constraint measured by the mobile robot 100. The image shown in FIG. 10 corresponds to the generated node Na20.

Referring to FIG. 10, in the border information generation process S114, the mobile robot 100 generates border information b20 corresponding to the traveling obstacle element V20. In the border information generation process S114, the mobile robot 100 generates border information corresponding to each traveling obstacle element. The plurality of pieces of border information one-to-one-corresponds to the plurality of traveling obstacle elements. The border information b20 may be generated based on the coordinate information D186 of the node Na20 and the distance value measured by the obstacle detection sensor 131.

Referring to FIG. 10, the node map generation process S113 and the border map generation process S115 are simultaneously performed. In the node map generation process S113, a node map including the plurality of nodes Na18, Na19 and Na20 is generated. In the border map generation process S115, the border map Ba including the plurality of pieces of border information b20 is generated. In the node map generation process S113 and the border map generation process S115, the basic map Ma including the node map and the border map Ba is generated. In FIG. 10, the basic map Ma which is being generated in the node map generation process S113 and the border map generation process S115 is shown.

In the image shown in FIG. 10, various feature points are identified by illuminations located on the ceiling, edges, corners, blobs and ridges. The mobile robot 100 detects the feature points from the image. Various methods (feature detection) of detecting feature points from images are well known in the field of computer vision. Various feature detectors suitable for detection of such feature points are known. For example, there are Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, Grey-level blob detectors.

Referring to FIG. 10, in the descriptor generation process S116, descriptors $\vec{F1}, \vec{F2}, \vec{F3}, \ldots, \vec{F7}$ are generated based on the plurality of features f1, f2, f3, ..., and f7 detected from the acquired image. In the descriptor generation process S116, the plurality of descriptors $\vec{F1}, \vec{F2}, \vec{F3}, \ldots, \vec{Fm}$ is generated based on the plurality of feature points f1, f2, f3, ..., and fm detected from the plurality of acquired images (m being a natural number). The plurality of descriptors $\vec{F1}, \vec{F2}, \vec{F3}, \ldots, \vec{Fm}$ one-to-one-corresponds to the plurality of feature points f1, f2, f3, ..., and fm.

$\vec{F1}, \vec{F2}, \vec{F3}, \ldots, \vec{Fm}$ mean an n-dimensional vector. f1(1), f1(2), f1(3), and f1(n) in braces of $\vec{F1}$ mean numerical values of each dimension of $\vec{F1}$. The remaining $\vec{F2}, \vec{F3}, \ldots, \vec{F7}$ are expressed using the same notation and thus a description thereof will be omitted.

For feature detection, a plurality of descriptors $\vec{F1}, \vec{F2}, \vec{F3}, \ldots, \vec{Fm}$ corresponding to the plurality of feature points f1, f2, f3, ..., and fm may be generated using a scale invariant feature transform (SIFT) method.

For example, feature points f1, f2, f3, f4, f5, f6 and f7 which are easily identified from the image may be selected by applying the SIFT method and then a descriptor as an n-dimensional vector may be generated based on the distribution characteristics of the brightness gradients (a brightness change direction and a degree of change) of pixels belonging to a certain area around each of the feature points f1, f2, f3, f4, f5, f6 and f7. Here, an n-dimensional vector (descriptor) in which the brightness change direction of each feature point is regarded as each dimension and a degree of change in the brightness change direction is a numerical value of each dimension may be generated. The SIFT method may detect invariant features in scale, rotation and brightness change of an object to be captured and thus detect invariant (that is, rotation-invariant) features even if the same area is captured while changing the orientation of the mobile terminal 100. Of course, the present invention is not limited thereto and the various other methods (e.g., HOG: Histogram of Oriented Gradient, Haar feature, Fems, LBP: Local Binary Pattern, MCT: Modified Census Transform) are applicable.

Figure 11:
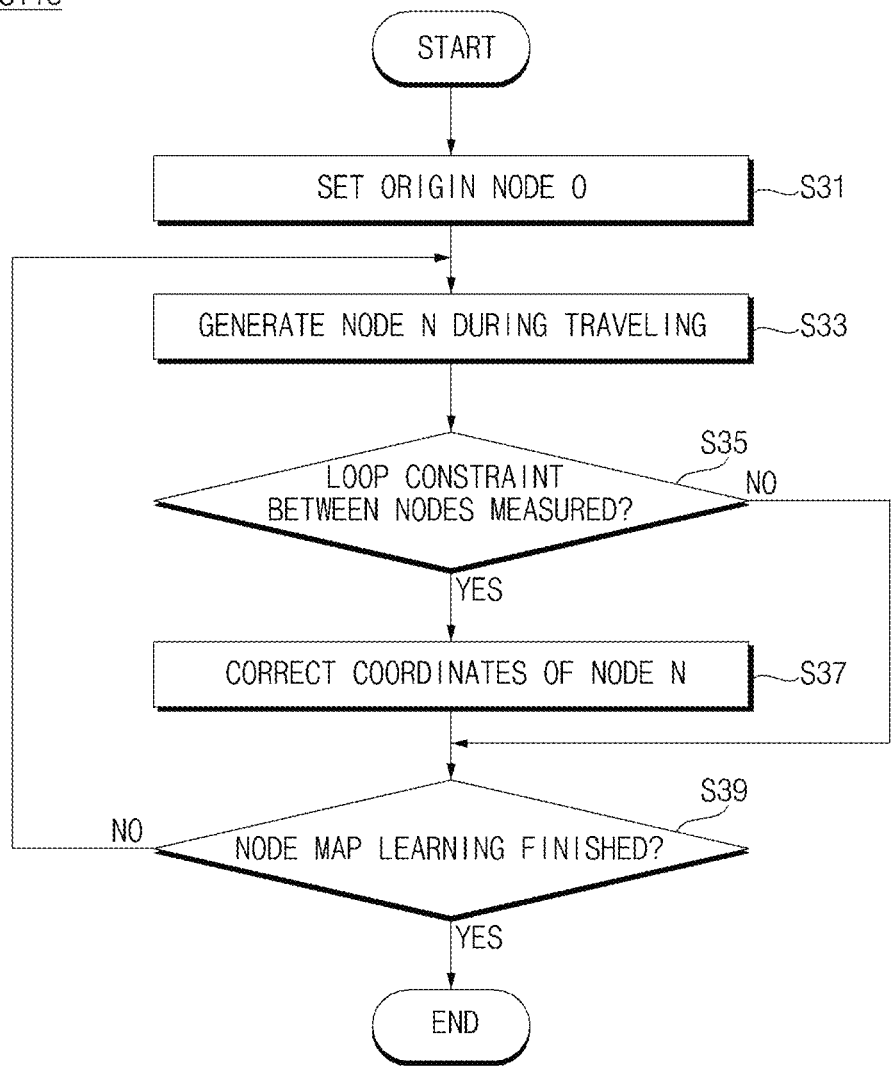
FIG. 11 is a flowchart illustrating one embodiment of the node generation process S112 and the node map generation process S113 of FIG. 10 in detail.
Figure 12:
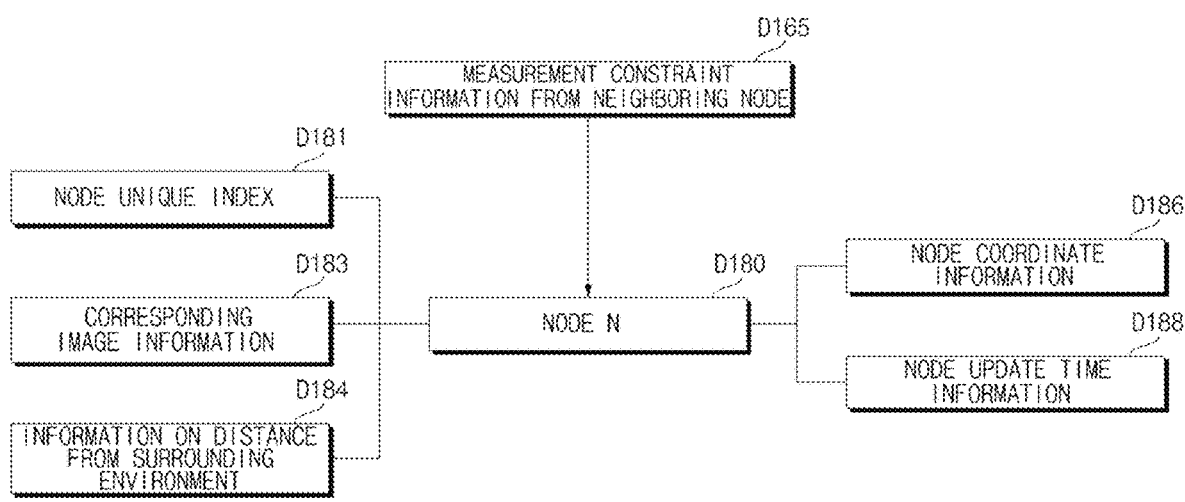
FIG. 12 is a block diagram showing information affecting the configuration information of a node N generated according to FIG. 11 and information on the node N.
Figure 13:
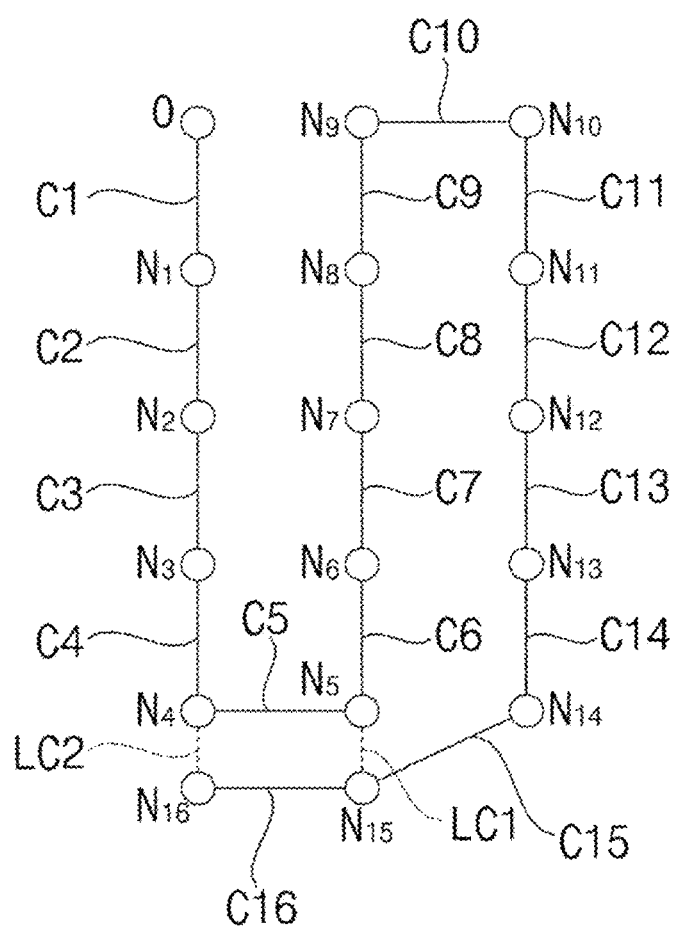
FIG. 13 is a view showing a plurality of nodes N generated while a mobile robot moves according to FIG. 11 and constraints C between the nodes.

Referring to FIGS. 11 to 13, the node generation process S112 and the node map generation process S113 will be described in greater detail. The node map of the mobile robot 100 is generated based on the node information D180. The node information 180 may be stored in the mobile robot 100 as data.

Referring to FIG. 11, the learning process includes a process S31 of setting an origin node O. The origin node O is a reference point on the node map. The node coordinate information D186 may be generated by adding the traveling constraint to the origin node O. Even if the node coordinate information D186 is updated, the origin node O is not changed.

The learning process includes a process S33 of generating the node N while the mobile robot 100 travels, after the process S31 of setting the origin node O. In the process S33, the mobile robot 100 generates node information D180.

The learning process includes a process S35 of determining whether loop constraint (LC) between nodes N is measured. In the determination process S35, when the LC is measured, a process S37 of updating the coordinate information D186 of the node N is performed and, when the LC is not measured, a process S39 of determining whether node map learning of the mobile robot 100 is finished is performed. Upon node map learning is not finished in the process S39 of determining whether node map learning is finished, the process S33 of generating node information during traveling may be performed again. The flowchart of FIG. 11 is merely an embodiment and the order of the node information generation process S33 during traveling and the process S35 of determining whether the LC between nodes is measured may be reversed or these processes may be simultaneously performed.

Referring to FIG. 12, the node information D180 may include a node unique index D181 which allows identification of the node information D180 corresponding to any node among the plurality of pieces of node information D180.

In addition, the node information D180 includes image information D183 corresponding to the node N. The corresponding image information D183 is an image acquired through the image acquisition unit 120 at a point within the traveling area corresponding to the node N.

In addition, the node information D180 may include distance information from a surrounding environment D184 at the node N. The distance information from the surrounding environment D184 may be distance data measured by the obstacle detection sensor 131 at a point corresponding to the node N. The distance information from the surrounding environment D184 may include a distance value from a traveling obstacle element.

In addition, the node information D180 includes node coordinate information D186. The Node N coordinate information D186 may be generated based on the original node O and the traveling constraint. The node N coordinate information D186 may be generated based on the border information and the distance value from the traveling obstacle element.

In addition, the node information D180 may include node update time information D188. The node update time information D188 is data on a time when the node information D180 is generated or updated. For example, when the mobile robot 100 receives the node information D180 having the same node unique index D181 as the existing node information D180 from the outside, whether the node information D180 is updated may be determined based on the node update time information D188. The node update time information D188 may enable determination as to whether the information is updated to new node information D180.

The node update time information D188 is generated based on the time when the node information D180 is generated. At this time, the node unique index D181 of the generated node N2 is generated. In addition, image information D183 corresponding to the generated node N2 matches the node N2. In addition, the distance information from the surrounding environment D184 of the generated node N2 may match the node N2.

Meanwhile, the node information D180 may be updated based on the measurement constraint information D165 from a neighboring node D165. The measurement constraint information from the neighboring node D165 may include data on the traveling constraint. The measurement constraint information from the neighboring node D165 may include data on the LC. When the measurement constraint information from the neighboring node D165 is input to the controller 140, the prestored node information D180 may be generated or updated.

Update of the node information D180 may be update of the node coordinate information and the node update time information D188. Update of the node information D180 may be update of the corresponding image information D183.

Referring to FIG. 13, a traveling constraint C1 is set in a state in which the origin node O is set, thereby generating information D180 of the node N1. Thereafter, a traveling constraint C2 is added to the coordinate information D186 of the node N1 which is the start point of the measured traveling constraint C2, thereby generating the coordinate information D186 of the node N2 which is the end point of the traveling constraint C2. A traveling constraint C3 is measured in a state in which the information D180 of the node N2 is generated, thereby generating the information D180 of the node N3. Based on the sequentially measured traveling constraints C1, C2, C3, . . . , and C16, the information D180 of the nodes N1, N2, N3, . . . , and N16 is sequentially generated.

When a node C15 which is the start point of any one traveling constraint C15 is defined as a "basic node" of a node 16 which is the end point of the traveling constraint C15, the LC means a constraint between any one node N15 and another neighboring node N5 "other than the basic node N14 of the node N15".

For example, acquired image information D183 corresponding to any one node N15 may be compared with acquired image information D183 corresponding to another neighboring node N5, thereby measuring the LC between the two nodes N15 and N5. In another example, the distance information from the surrounding environment D184 of any one node N15 may be compared with the distance information from the surrounding environment D184 of another neighboring node N5, thereby measuring the LC between two nodes N15 and N5. In FIG. 19, the LC LC1 measured between the node N5 and the node N15 and the LC LC2 measured between the node N4 and the node N16 are shown.

The information D180 of any one node N5 generated based on the traveling constraint includes node coordinate information D186 and image information D183 corresponding to the node N5. When another node N15 is adjacent to the node N5, if the image information D183 corresponding to the node N15 is compared with the image information D183 corresponding to the node N5, the LC LC1 between the two nodes N5 and N15 is measured. When the "LC LC1" and the "constraint calculated according to the coordinate information D186 of the prestored two nodes N5 and N15" are different from each other, an error may be regarded as occurring in the node coordinate information D186 and the coordinate information D186 of the two nodes N5 and N15 may be updated. In this case, the coordinate information D186 of the other nodes N6, N7, N8, N9, N10, N11, N12, N13 and N14 connected to the two nodes N5 and N15 may also be updated. In addition, the node coordinate information D186 which has been updated once may be continuously updated through the above process.

More specifically, the two nodes N, between which the LC is measured, are defined as a first loop node and a second loop node. There may be a difference $\Delta x1-\Delta x2$, $\Delta y1-\Delta y2$ and $\theta 1-\theta 2$ between the calculated constraints $\Delta x1$, $\Delta y1$ and $\theta 1$ (calculated by a difference between coordinate values) calculated by the node coordinate information D186 of the prestored first loop node and the node coordinate information D186 of the second loop node, and the LCs $\Delta x2$, $\Delta y2$ and $\theta 2$. If this difference occurs, the difference may be regarded as an error and the node coordinate information D186 may be updated. On the assumption that the LC is more accurate than the calculated constraint, the node coordinate information D186 is updated.

When the node coordinate information D186 is updated, only the node coordinate information D186 of the first loop node and the second loop node may be updated. However, since the error occurs due to accumulation of the errors of the traveling constraints, the error may be distributed and the node coordinate information D186 of the other nodes may be updated. For example, the error value may be distributed to all nodes generated by the traveling constraint between the first loop node and the second loop node and the node coordinate information D186 may be updated. Referring to FIG. 13, if the LC LC1 is measured and the error is calculated, the error may be distributed to the nodes N6 to N14 between the first loop node N15 and the second loop node N5 and the node coordinate information D186 of the nodes N5 to N15 may be slightly updated. Of course, such error distribution may be extended and the node coordinate information D186 of the other nodes N1 to N4 may be updated.

Figure 14:
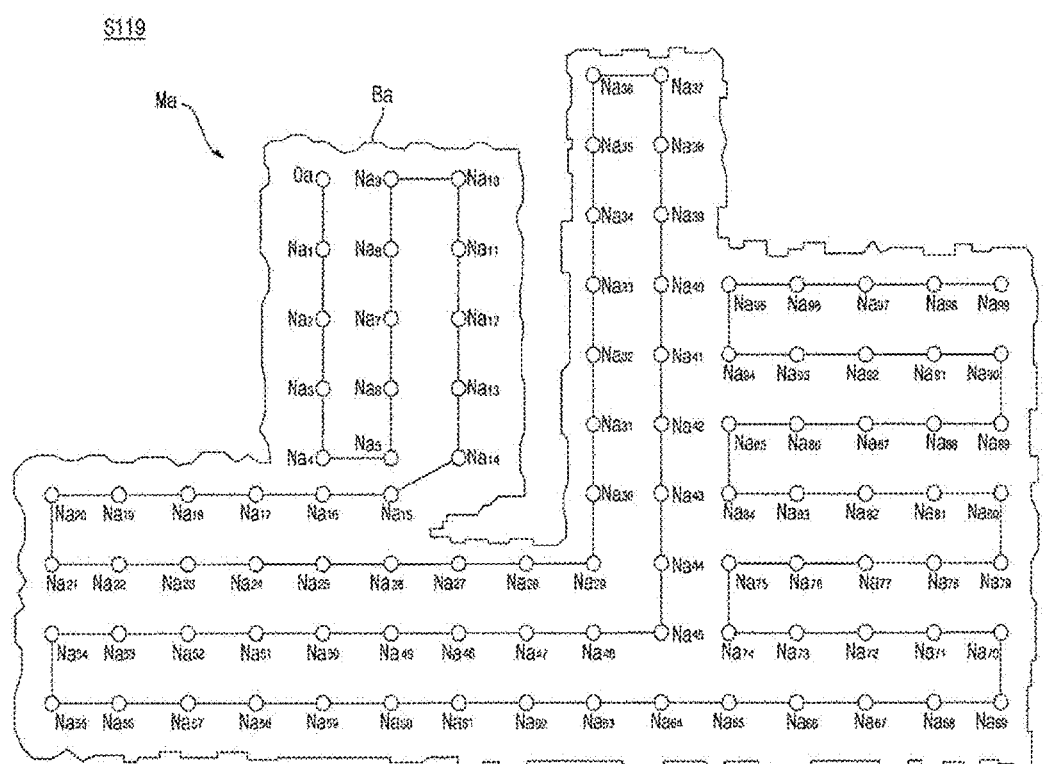
FIG. 14 is a view showing an example of a first basic map Ma generated according to the control method of FIG. 8, wherein the first basic map includes the node map generated according to FIGS. 10 to 13. In addition.

FIG. 14 shows an example of the first basic map Ma generated in the first basic learning process S110a. The first basic map Ma includes the first node map and the first border map Ba. The first node map includes a plurality of first nodes Na1 to Na99. The first border map Ba includes a plurality of pieces of first border information. The first border map Ba corresponds to the entire shape of the first traveling area.

Figure 15:
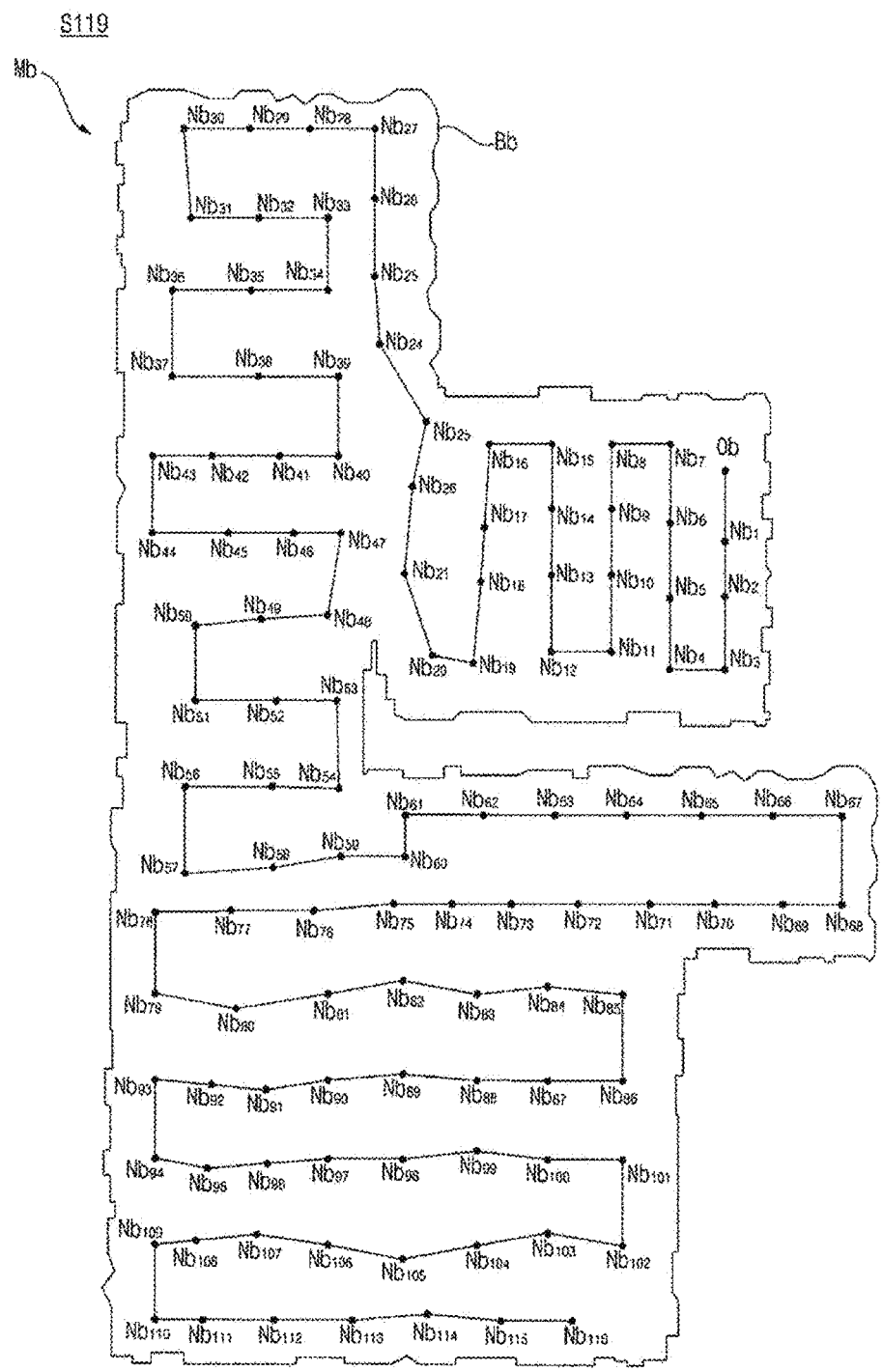
FIG. 15 is a view showing an example of a second basic map Mb generated according to the control method of FIG. 8.

FIG. 15 shows an example of the second basic map Mb generated in the second basic learning process S110b. The second basic map Mb includes the second node map and the second border map Bb. The second node map includes a plurality of second nodes Nb1 to Nb116. The second border map Bb includes a plurality of pieces of second border information. The second border map Bb corresponds to the entire shape of the second traveling area.

Referring to FIGS. 14 and 15, it can be seen that, when the first basic map Ma and the second basic map Mb according to an example are compared, the traveling route of the mobile robot 100 in the first basic learning process S110a and the traveling route of the mobile robot 100 in the second basic learning process S110b are different from each other. Therefore, the plurality of first nodes Na1 to Na99 of the first basic map Ma is different from the plurality of second nodes Nb1 to Nb116 of the second basic map Mb. Even if the traveling route of the mobile robot 100 in the first basic learning process S110a and the traveling route of the mobile robot 100 in the second basic learning process S110b are different from each other, when the first traveling area and the first traveling area are the same, the first border map Ba and the second border map Bb may be very similar to each other and thus a degree of similarity equal to or greater than a predetermined criterion may be calculated. Even if the first basic map Ma and/or the second basic map Mb are generated in different directions, the degree of similarity between the first border map Ba and the second border map Bb is invariantly set. For example, the first basic map Ma of FIG. 14 has a coordinate system in which a long direction of the first basic map is an X-axis and a short direction of the first basic map is a Y-axis, and the second basic map Mb of FIG. 15 has a coordinate system in which a long direction of the second basic map is a Y-axis and a short direction of the second basic map is an X-axis. In this case, the degree of similarity between the first basic map Ma and the second basic map Mb is equal to the degree of similarity calculated by rotating the second basic map Mb 90 degrees counterclockwise to have the same coordinate system as the first basic map Ma and comparing the second basic map Ma with the first basic map Ma.

The merging condition may include a condition in which the degree of similarity calculated by comparing the first border map Ba with the second border map Bb is equal to or greater than a predetermined value. When the degree of similarity calculated by comparing the first border map Ba with the second border map Bb is equal to or greater than the predetermined value, the first border map Ba and the second border map Bb are merged to generate the merged map Mu. Hereinafter, assume that the degree of similarity between the first basic map Ma of FIG. 14 and the second basic map Mb of FIG. 15 is equal to or greater than the predetermined value and the merging condition is satisfied.

Figure 16:
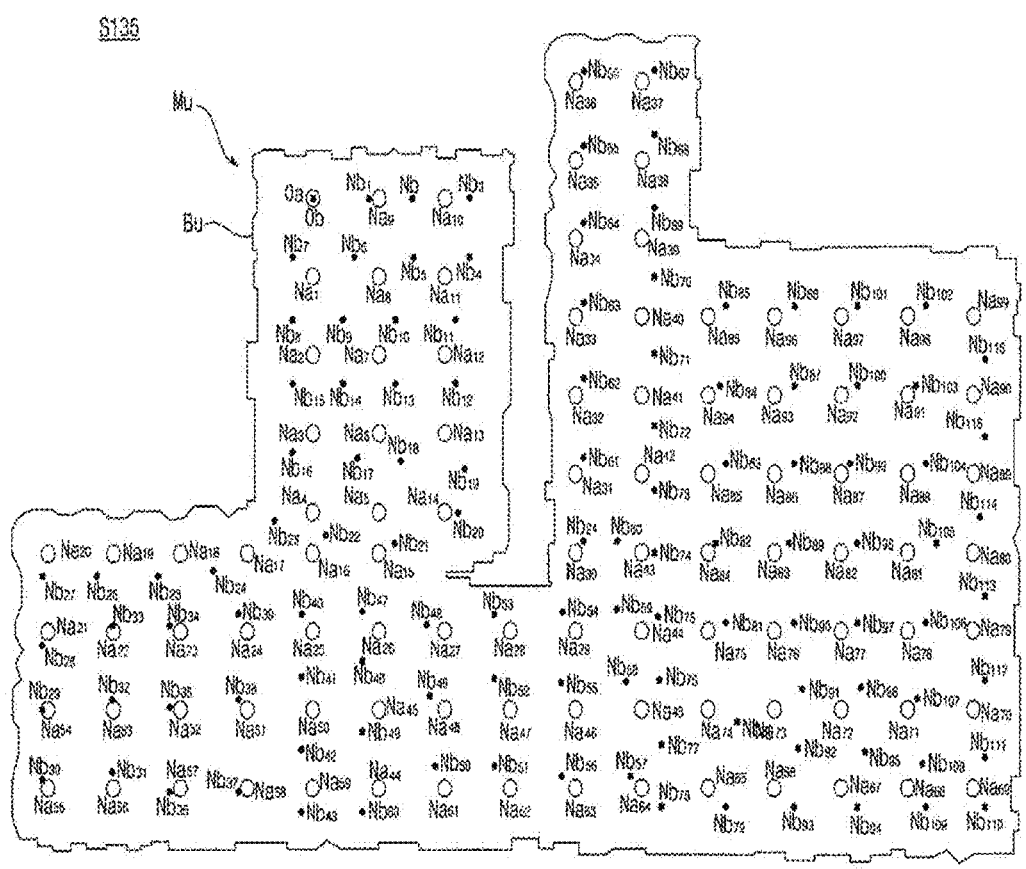
FIG. 16 is a view showing a merged map Mu generated in a merging step S135 of FIGS. 6 and 7, which shows the merged map Mu generated by merging the basic map Ma of FIG. 14 and the basic map Mb of FIG. 15.

FIG. 16 shows an example of the merged map Mu generated by merging the first basic map Ma of FIG. 14 and the second basic map Mb of FIG. 15. The merged map Mu includes a first node map and a second node map. The merged map Mu includes the plurality of first nodes Na1 to Na99 and the plurality of second nodes Nb1 to Nb116.

The merged map Mu includes a merged border map Mu generated based on the first border map Ba and the second border map Bb. For example, the plurality of pieces of first border information and the plurality of pieces of second border information may match each other, any one of the matched first and second border information may be selected according to a predetermined criterion and set as merged border information, and a merged border map Bu including a plurality of pieces of merged border information may be generated. In another example, the plurality of pieces of first border information and the plurality of pieces of second border information may match each other, a representative value (e.g., an average value) of the matched first and second border information may be set as merged border information, and a merged border map Bu including the plurality of pieces merged border information may be generated. In addition, if non-matched information is present in the plurality of pieces of first border information and the plurality of pieces of second border information, any one of the first border information and the second border information may be selected and set as merged border information such that a divided area widens.

Figure 17:
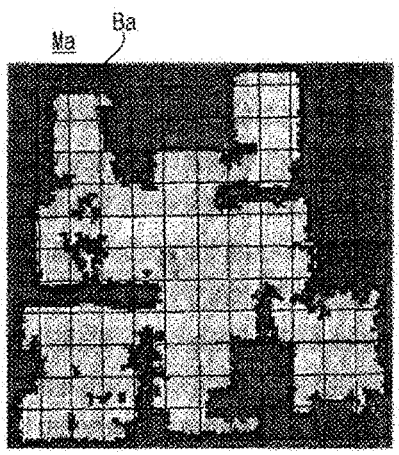
FIG. 17 is a view showing an example of the merging step S135 of FIGS. 6 and 7, which shows only a border map in a state of excluding the node map from the basic maps Ma and Mb.
Figure 17:
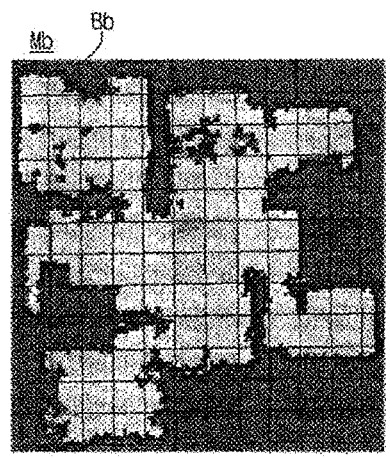
Figure 17:
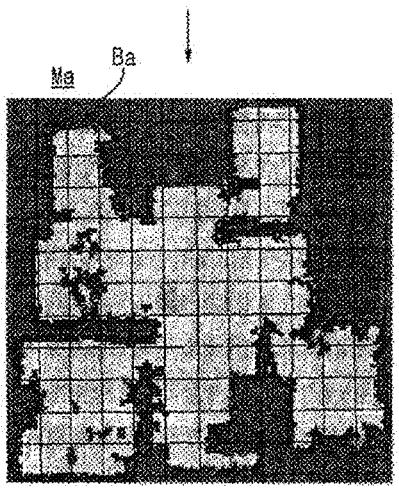
Figure 17:
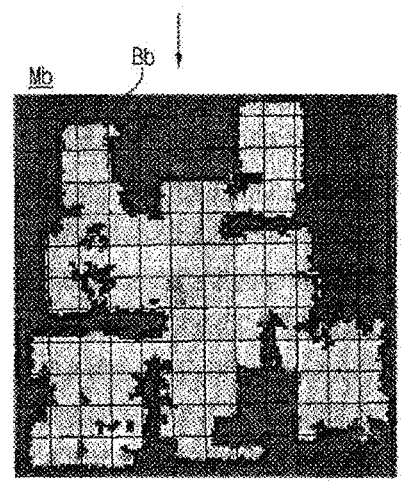
Figure 17:
Figure 17:
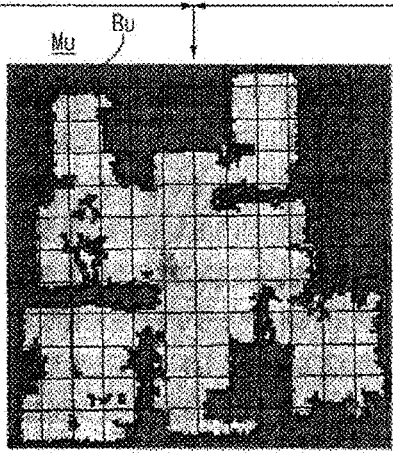

Referring to FIG. 17, a process of merging the first basic map Ma and the second basic map Mb to generate a merged map Mu according to another example will be described. In the basic maps Ma and Mb of FIG. 17, the node map is omitted and only the border maps Ba and Bb are shown. The first border map Ba of the first basic map Ma and the second border map Bb of the second basic map Mb are respectively generated on different coordinate systems. In the merging process S135, in order to align any one of the first basic map Ma and the second basic map Mb on the coordinate system of the other basic map, any one map rotates. Alternatively, in the merging process S135, in order to align the first basic map Ma and the second basic map Mb on a new coordinate system, at least one of the first basic map Ma or the second basic map Mb may be rotated and placed on the new coordinate system. The first basic map Ma and the second basic map Mb are aligned on one coordinate system to generate the merged map Mu.

Figure 18:
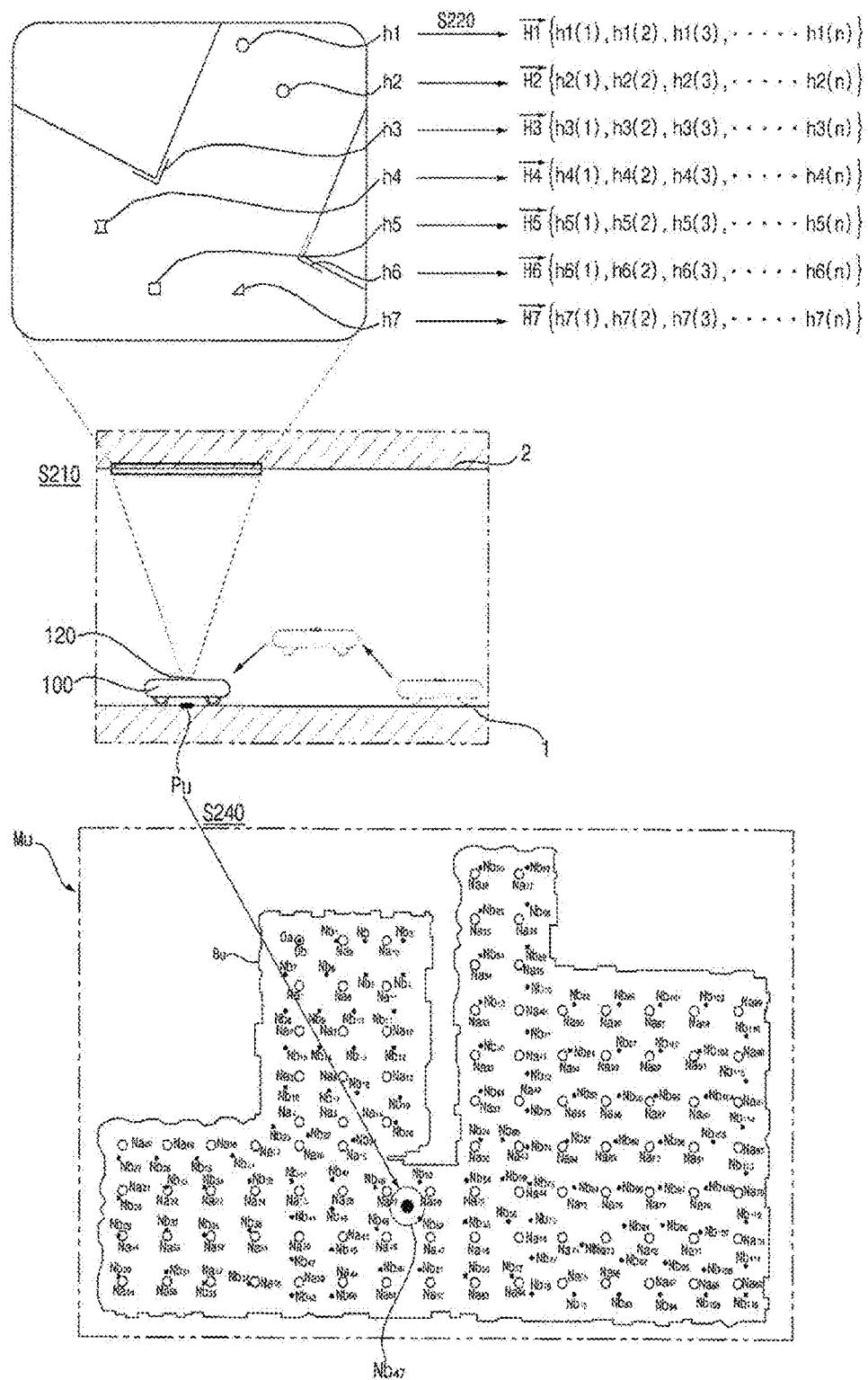
FIG. 18 is a view showing a recognition image acquisition process S210, a recognition descriptor generation process S220 and a node selection process S240 of FIG. 9.

Referring to FIG. 18, a detailed example of the recognition process S210 will be described.

When the current point Pu of the mobile robot 100 becomes unknown due to occurrence of the position jumping situation, the process S210 of acquiring the recognition image starts. The image acquisition unit 120 acquires a recognition image at the unknown current position Pu. The recognition image may be obtained by capturing the upper side of the mobile robot 100. The recognition image is obtained by capturing the ceiling 2. The image shown in FIG. 18 is a recognition image corresponding to the current point Pu.

Referring to FIG. 18, in the recognition descriptor generation process S220, a plurality of recognition descriptors $\vec{H1}, \vec{H2}, \vec{H3}, \ldots, \vec{H7}$ is generated based on a plurality of recognition feature points h1, h2, h3, . . . , and h7 detected from the recognition image. The plurality of recognition descriptors $\vec{H1}, \vec{H2}, \vec{H3}, \ldots, \vec{H7}$ one-to-one-corresponds to the recognition feature points h1, h2, h3, . . . , and h7. f1(1), f1(2), f1(3), . . . , and f1($n$) in braces of $\vec{H1}$ mean numerical values of each dimension of $\vec{H1}$. The remaining $\vec{H2}$, $\vec{H3}, \ldots, \vec{H7}$ are expressed using the same notation and thus a description thereof will be omitted.

For feature detection, a plurality of recognition descriptors $\vec{H1}, \vec{H2}, \vec{H3}, \ldots, \vec{H7}$ corresponding to the plurality of feature points f1, f2, f3, . . . , and f7 may be generated using the SIFT method. Various methods of detecting features from images and various feature detectors suitable for detection of these features in the field of computer vision were described above.

In the comparison process S230, the recognition image information including the plurality of recognition descriptors $\vec{H1}, \vec{H2}, \vec{H3}, \ldots, \vec{H7}$ may be compared with the plurality of pieces of image information corresponding to the plurality of nodes on the merged map Mu. The plurality of nodes on the merged map Mu includes a plurality of first nodes Na1 to Na99 and the plurality of second nodes Nb1 to Nb116. In the comparison process S230, the recognition image information may be compared with the image information including the plurality of descriptors generated based on the images acquired in the learning process S100. In the comparison process S230, the images corresponding to the plurality of nodes on the merged map Mu may be compared with the recognition image. In the comparison process S230, any one of various known methods may be used.

Referring to FIG. 18, a node Nb47 corresponding to an image having a highest degree of similarity as the result of the comparison process S230 is selected as a final node.

The invention claimed is:

1. A method of controlling a mobile robot cleaning an interior area while driving, the method comprising:
   a first basic learning process of generating a first basic map based on environment information acquired in a traveling process when a light is on in the interior area;
   a second basic learning process of generating a second basic map based on environment information acquired in a separate traveling process when a light is off in the interior area; and
   a merging process of merging the first basic map and the second basic map to generate a merged map.

2. The method according to claim 1,
   wherein the first basic map includes a plurality of first nodes corresponding to a plurality of points within a traveling area,
   wherein the second basic map includes a plurality of second nodes corresponding to a plurality of second points within a traveling area, and
   wherein the merged map includes the plurality of first nodes and the plurality of second nodes.

3. The method according to claim 1,
   wherein the first basic map includes a plurality of first nodes corresponding to a plurality of points within a traveling area,
   wherein the second basic map includes a plurality of second nodes corresponding to a plurality of second points within a traveling area, and
   wherein the merged map includes a plurality of nodes one-to-one-corresponding to the plurality of first nodes and the plurality of second nodes.

4. The method according to claim 3, wherein, in the merging process, coordinate information of at least one of the plurality of first nodes or the plurality of second nodes is changed, relative coordinates between the plurality of nodes on the merged map one-to-one-corresponding to the plurality of first nodes are equal to relative coordinates between the plurality of first nodes, and relative coordinates between the plurality of nodes on the merged map one-to-one-corresponding to the plurality of second nodes are equal to relative coordinates between the plurality of first nodes.

5. The method according to claim 3,
   wherein the environment information includes image information,
   wherein the plurality of first nodes and the plurality of second nodes have image information acquired at each point, and
   wherein image information of the plurality of nodes on the merged map one-to-one-corresponding to the plurality of first nodes is equal to image information of the plurality of first nodes, and image information of the plurality of nodes on the merged map one-to-one-corresponding to the plurality of second nodes is equal to image information of the plurality of second nodes.

6. The method according to claim 1,
   wherein, in the first basic learning process, a first traveling obstacle element is detected and the first basic map including first border information corresponding to the first traveling obstacle element is generated,
   wherein, in the second basic learning process, a second traveling obstacle element is detected and the second basic map including second border information corresponding to the second traveling obstacle element is generated, and
   wherein, in the merging process, the first basic map and the second basic map are merged based on the first border information and the second border information.

7. The method according to claim 1,
   wherein, in the first basic learning process, a first traveling obstacle element is detected and a first border map including first border information corresponding to the first traveling obstacle element is generated,
   wherein, in the second basic learning process, a second traveling obstacle element is detected and a second border map including second border information corresponding to the second traveling obstacle element is generated, and
   wherein, in the merging process, the first border map and the second border map are aligned on one coordinate system to generate the merged map.

8. The method according to claim 1,
   wherein the first basic map includes a first border map corresponding to an entire shape of a first traveling area and a plurality of first nodes having relative coordinate information with respect to the first border map,
   wherein the second basic map includes a second border map corresponding to an entire shape of a second traveling area and a plurality of second nodes having relative coordinate information with respect to the second border map, and
   wherein, in the merging process, the first border map and the second border map are aligned on one coordinate system to generate the merged map including the plurality of first nodes having coordinate information on the coordinate system and the plurality of second nodes having coordinate information on the coordinate system.

9. The method according to claim 1,
   wherein, in the first basic learning process, a plurality of first nodes on the first basic map corresponding to a plurality of points of a traveling area is generated, and
   wherein, in the second basic learning process, a plurality of second nodes on the second basic map corresponding to a plurality of points of a traveling area is generated.

10. The method according to claim 1,
   wherein, in the first basic learning process, environment information of each first point is acquired during traveling and each first node on the first basic map corresponding to each first point is generated, and
   wherein, in the second basic learning process, environment information of each second point is acquired during traveling and each second node on the second basic map corresponding to each second point is generated.

11. The method according to claim 1, comprising a merging condition determination process of determining whether a merging condition of the first basic map and the second basic map is satisfied, before the merging process.

12. The method according to claim 11,
   wherein, in the first basic learning process, a first traveling obstacle element is detected and a first border map including first border information corresponding to the first traveling obstacle element is generated, wherein, in the second basic learning process, a second traveling obstacle element is detected and a second border map including second border information corresponding to the second traveling obstacle element is generated, and wherein the merging condition includes a condition in which a degree of similarity between the first border map and the second border map is equal to or greater than a criterion.

13. The method according to claim 1, further comprising a node selection process of selecting a node estimated as a current position on a merged map after the merging process.

14. The method according to claim 1,
wherein, in the first basic learning process, an image of each first point is acquired during traveling and each first node on the first basic map corresponding to each first point is generated,
wherein, in the second basic learning process, an image of each second point is acquired during traveling and each second node on the second basic map corresponding to each second point is generated,
wherein, in the merging process, a merged map including the plurality of first nodes and the plurality of second nodes is generated, and
wherein, after the merging process, a node selection process of acquiring a recognition image at a current position, comparing recognition image information with image information on the merged map, and selecting a node estimated as the current position among from the plurality of first nodes and the plurality of second nodes on the merged map is included.

15. A mobile robot comprising:
a traveling unit configured to move a main body in an interior area;
an environment information acquisition unit configured to acquire environment information during traveling; and
a controller configured to generate a first basic map and a second basic map based on environment information respectively acquired in separate traveling processes when a light is on and off in the interior area and to merge the first basic map and the second basic map to generate a merged map.

\* \* \* \* \*